US012640068B2

(12) United States Patent
Sakurai

(10) Patent No.: US 12,640,068 B2
(45) Date of Patent: May 26, 2026

(54) DISPLAY SYSTEM AND METHOD OF OPERATING DISPLAY SYSTEM

(71) Applicant: SONY GROUP CORPORATION, Tokyo (JP)

(72) Inventor: Hisao Sakurai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/862,313

(22) PCT Filed: Apr. 24, 2023

(86) PCT No.: PCT/JP2023/016068
§ 371 (c)(1),
(2) Date: Nov. 1, 2024

(87) PCT Pub. No.: WO2023/218922
PCT Pub. Date: Nov. 16, 2023

(65) Prior Publication Data
US 2025/0279019 A1 Sep. 4, 2025

(30) Foreign Application Priority Data
May 9, 2022 (JP) ................................ 2022-077028

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2320/0626* (2013.01); *G09G 2330/021* (2013.01)

(58) Field of Classification Search
None
See application file for complete search history.

(56) References Cited

U.S. PATENT DOCUMENTS 4,177,389 A * 12/1979 Schott ........................ H02J 9/06 363/21.04
5,327,172 A * 7/1994 Tan .......................... H04N 5/63 348/378
(Continued)

FOREIGN PATENT DOCUMENTS

CN 110888762 A * 3/2020 ............... G06F 1/30
CN 113036900 A * 6/2021 .............. H02J 9/061
(Continued)

OTHER PUBLICATIONS

International Search Report and Written Opinion of PCT Application No. PCT/JP2023/016068, issued on Jun. 20, 2023, 09 pages of ISRWO.

*Primary Examiner* — Patrick N Edouard
*Assistant Examiner* — Peijie Shen
(74) *Attorney, Agent, or Firm* — CHIP LAW GROUP

(57) ABSTRACT

The present disclosure relates to a display system and a method of operating the display system for enabling display to be continued even if any of a plurality of power supply devices for normal luminance fails in a case where a power supply device for a high-luminance direct-view light emitting diode (LED) display is implemented by the plurality of power supply devices for normal luminance. A plurality of normal-luminance power supplies that supplies power necessary for driving a driver group that drives light emitting diodes (LEDs) arranged in an array on the basis of a video signal in a normal-luminance mode, and a power supply switch that switches on/off of power supply from the plurality of normal-luminance power supplies to the driver group are provided, and when an abnormality is detected in the power supply, the power supply switch is turned off, and the LEDs are switched from a high-luminance mode to the normal luminance mode and are driven, and then the power (Continued)

supply switch is controlled to be turned on. The present disclosure can be applied to an LED display device.

17 Claims, 10 Drawing Sheets

(56) References Cited

U.S. PATENT DOCUMENTS

| | | | | | |
|---|---|---|---|---|---|
| 5,949,499 | A * | 9/1999 | George | H04N 5/63 | 348/730 |
| 7,243,261 | B2 * | 7/2007 | Yashiro | H02J 9/005 | 714/14 |
| 7,363,520 | B1 * | 4/2008 | Maier, Jr. | G06F 1/26 | 713/300 |
| 10,497,302 | B2 * | 12/2019 | Peng | G09G 3/3677 | |
| 12,187,208 | B2 * | 1/2025 | Takahashi | B60R 16/03 | |
| 2009/0312884 | A1 | 12/2009 | Li et al. | | |
| 2014/0097758 | A1 * | 4/2014 | Recker | H05B 47/19 | 315/297 |
| 2014/0375706 | A1 * | 12/2014 | Lee | G09G 3/3611 | 345/697 |
| 2015/0076910 | A1 | 3/2015 | Wang | | |
| 2018/0136894 | A1 * | 5/2018 | Lee | G09G 5/14 | |
| 2021/0049954 | A1 * | 2/2021 | Lee | G09G 3/3406 | |
| 2021/0142704 | A1 * | 5/2021 | Kim | G09G 5/10 | |
| 2024/0336150 | A1 * | 10/2024 | Kim | B64D 27/357 | |

FOREIGN PATENT DOCUMENTS

| | | | |
|---|---|---|---|
| JP | 2019211714 | A * | 12/2019 |
| WO | 2018/164105 | A1 | 9/2018 |

* cited by examiner

DISPLAY SYSTEM AND METHOD OF OPERATING DISPLAY SYSTEM

CROSS REFERENCE TO RELATED APPLICATIONS

This application is a U.S. National Phase of International Patent Application No. PCT/JP2023/016068 filed on Apr. 24, 2023, which claims priority benefit of Japanese Patent Application No. JP 2022-077028 filed in the Japan Patent Office on May 9, 2022. Each of the above-referenced applications is hereby incorporated herein by reference in its entirety.

TECHNICAL FIELD

The present disclosure relates to a display system and a method of operating the display system, and more particularly to a display system and a method of operating the display system for enabling display to be continued even if any of a plurality of power supply devices for normal luminance fails in a case where a power supply device for a high-luminance direct-view light emitting diode (LED) display is implemented by the plurality of power supply devices for normal luminance.

BACKGROUND ART

A direct-view display market using a light emitting diode (LED) as a display element is expanding, and various technologies related to such an LED display have been proposed.

For example, a technique for suppressing occurrence of color unevenness in a direct-view display using an LED has been proposed (see Patent Document 1).

CITATION LIST

Patent Document

Patent Document 1: WO 2018/164105 A

SUMMARY OF THE INVENTION

Problems to be Solved by the Invention

Moreover, in recent years, a tiling display market in which a plurality of display units including LED displays are arranged in an array is expanding among direct-view displays using LEDs.

Furthermore, under such circumstances, development of an LED display corresponding to high luminance for the purpose of more faithfully reproducing luminance is in progress.

Moreover, since the power supply devices have also been downsized in recent years, there is a case where two power supply devices are mounted on one display unit as measures against an increase in a power supply load and a failure, and both measures against an overload and a redundancy function (a function to maintain an operation even if one of the two power supply devices fails) are achieved.

Therefore, by applying such a configuration, it is conceivable to increase a power supply capacity by operating two power supply devices of a display unit corresponding to normal luminance in parallel by power supply load distribution, and to implement a power supply device of a display unit corresponding to high luminance.

However, in a case where the power supply device of a display unit corresponding to high luminance is implemented by the two power supply devices corresponding to normal luminance as described above, when one of the two power supply devices fails, there is a possibility that the display cannot be continued due to an overload due to a shortage of the entire power even in a state where the other power supply device does not fail.

The present disclosure has been made in view of such a situation, and enables display to be continued even if any of a plurality of power supply devices for normal luminance fails in a case where a power supply device for a high-luminance direct-view light emitting diode (LED) display is implemented by the plurality of power supply devices for normal luminance.

Solutions to Problems

A display system according to one aspect of the present disclosure is a display system including: a driver configured to drive a display element on the basis of a video signal; a plurality of power supplies configured to supply power capable of driving the display element to the driver in a first luminance mode in which the display element is driven in a first luminance range; and a driver control unit configured to control the driver so as to switch a luminance mode of the display element, in which the driver control unit controls the driver to drive the display element in a second luminance mode in which the display element is driven in a second luminance range higher in luminance than the first luminance range by power supply from the plurality of power supplies, and performs control to switch from the second luminance mode to the first luminance mode so that the driver drives the display element in the first luminance mode on the basis of detection of an abnormality in any of the plurality of power supplies.

A method of operating a display system according to one aspect of the present disclosure is a method of operating a display system including a driver that drives a display element on the basis of a video signal, a plurality of power supplies that supplies power capable of driving the display element to the driver in a first luminance mode in which the display element is driven in a first luminance range, and a driver control unit that controls the driver so as to switch a luminance mode of the display element, the method including: by the driver control unit, controlling the driver to drive the display element in a second luminance mode in which the display element is driven in a second luminance range higher in luminance than the first luminance range by the power supply from the plurality of power supplies; and performing control to switch from the second luminance mode to the first luminance mode so that the driver drives the display element in the first luminance mode on the basis of detection of an abnormality in any of the plurality of power supplies, in which the driver control unit drives the display element in the second luminance mode by the power supply from the plurality of power sources, and performs control to switch from the second luminance mode to the first luminance mode so that the driver drives the display element in the first luminance mode on the basis of the detection of the abnormality in any of the plurality of power supplies.

In one aspect of the present disclosure, a display element is driven by a driver on the basis of a video signal, power capable of driving the display element is supplied by a plurality of power supplies to the driver in a first luminance mode in which the display element is driven in a first luminance range, the driver is controlled by a driver control unit so as to switch a luminance mode of the display element, the driver is controlled by the driver control unit to drive the display element in a second luminance mode in which the display element is driven in a second luminance range higher in luminance than the first luminance range by power supply from the plurality of power supplies, and control is performed by the driver control unit to switch from the second luminance mode to the first luminance mode so that the driver drives the display element in the first luminance mode on the basis of detection of an abnormality in any of the plurality of power supplies.

MODE FOR CARRYING OUT THE INVENTION

Hereinafter, a favorable embodiment of the present disclosure will be described in detail with reference to the accompanying drawings. Note that, in the present specification and the drawings, components having substantially the same functional configurations are denoted by the same reference signs, and redundant descriptions are omitted.

Hereinafter, a mode for carrying out the present technology will be described. Description will be given in the following order.

1. Outline of Present Disclosure
2. Favorable Embodiment
3. Application Example

1. Outline of Present Disclosure

The present disclosure enables display to be continued even if an abnormality occurs in any of a plurality of power supply devices for normal luminance in a case where a power supply device for a high-luminance direct-view light emitting diode (LED) display is operated by the plurality of power supply devices for normal luminance.

In recent years, a tiling display market in which a plurality of display units including small LED displays is arranged in an array is expanding among direct-view displays using LEDs, and moreover, development of high luminance for the purpose of more accurate luminance reproduction has been advanced.

More specifically, there has been a high-luminance model such as several 1000 cd/m$^2$ in a direct-view LED display for outdoor use having a dot pitch of about 10 mm.

However, in recent years, miniaturization of LED chips has progressed, and direct-view LED displays having a dot pitch of around 1.0 mm have rapidly spread, and luminance of these LED displays is approximately 1000 cd/m$^2$.

This luminance is a result of being restricted by heat dissipation, a power supply capacity (power supply size) to be mounted, and by increasing the power supply capacity, a direct-view LED display with ultra-high luminance of, for example, 4000 cd/m$^2$ or more, which greatly exceeds 1000 cd/m$^2$, has appeared although it depends on the use.

Figure 1:
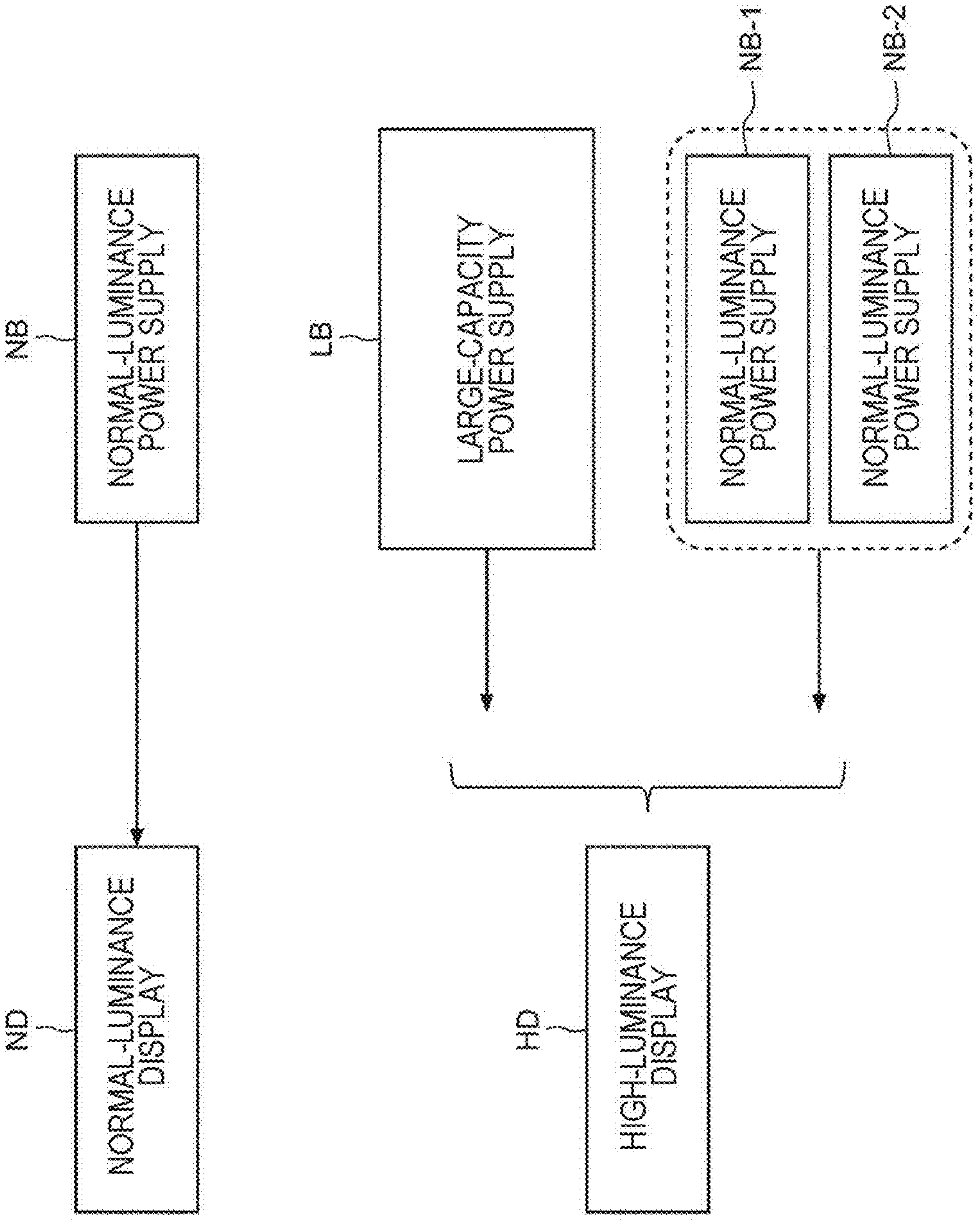
FIG. 1 is a diagram for describing respective power supplies of a normal-luminance display and a high-luminance display.

To implement high luminance of the LED display, a large-capacity power supply LB having a larger capacity than that of a normal-luminance power supply NB as illustrated in the upper part of the lower row of FIG. 1 is required for the normal-luminance power supply NB required for a normal-luminance display ND as illustrated in the upper row of FIG. 1.

That is, the upper part of the lower row of FIG. 1 illustrates a configuration in which the large-capacity power supply LB having a larger capacity than that of the normal-luminance power supply NB supplies power to a high-luminance display HD including an LED display corresponding to high luminance.

However, simply increasing the capacity of the power supply increases the size of a housing constituting the display unit as the large-capacity power supply LB increases in size.

Furthermore, in a case where the power supply of the display unit is configured only with the large-capacity power supply LB, display of the high-luminance display HD cannot be continued when a failure occurs.

Moreover, when the display units including the high-luminance display HD are connected in a row (in a daisy chain), a signal cannot be transmitted to the display unit in a subsequent stage, and thus there is a possibility that the display unit int the subsequent stage cannot be displayed.

Meanwhile, since the normal-luminance power supply has been downsized through recent development, it is conceivable to supply power to the high-luminance display HD by increasing the capacity by two normal-luminance power supplies NB-1 and NB-2 as illustrated in the lower part of the lower row of FIG. 1.

Moreover, by increasing the capacity by the two normal-luminance power supplies NB-1 and NB-2, for example, even if an abnormality occurs in one of the two normal-luminance power supplies NB, the other normal-luminance power supply NB can continue the display with the normal luminance.

Note that the number of the normal-luminance power supplies NB may be two or more as long as it is plural. Furthermore, the “plurality of normal-luminance power supplies NB” may include a case where one power supply device includes a plurality of power supply regions capable of individual operation corresponding to the normal-luminance power supply NB.

<Configuration Example in Case of Using Two Normal-Luminance Power Supplies>

Figure 2:
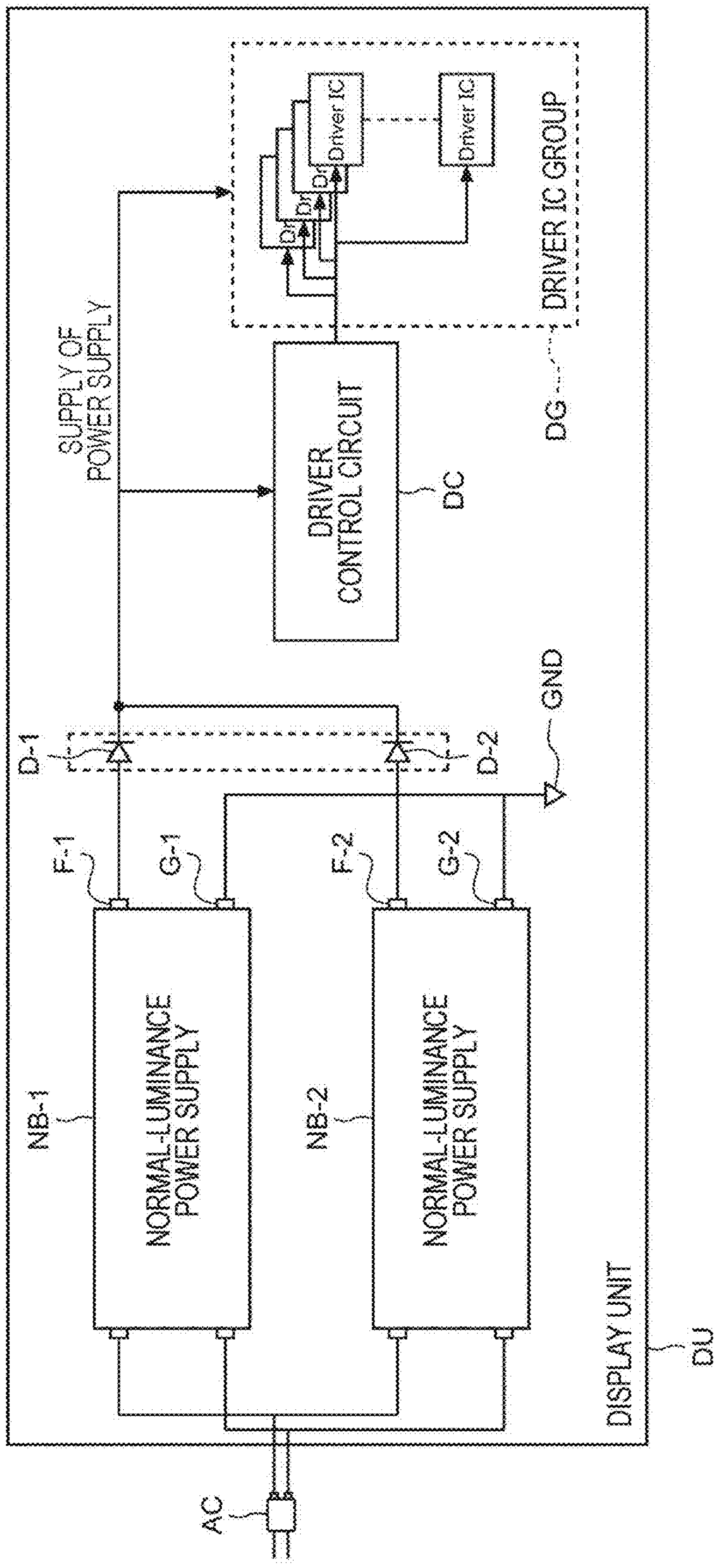
FIG. 2 is a diagram for describing a configuration example of a display unit that implements a power supply of a high-luminance display by two normal-luminance power supplies.

FIG. 2 illustrates a configuration example of a display unit DU that supplies power corresponding to high luminance to a driver IC group DG that drives LEDs corresponding to high luminance by the two normal-luminance power supplies NB-1 and NB-2.

The display unit DU of FIG. 2 includes normal-luminance power supplies NB-1 and NB-2, diodes D-1 and D-2, a driver control circuit DC, and the driver IC group DG.

Each of the normal-luminance power supplies NB-1 and NB-2 is a power supply device used in a display unit including an LED display corresponding to normal luminance. The normal-luminance power supplies NB-1 and NB-2 are provided with terminals for receiving an AC input from an alternating current (AC) power supply, and are respectively provided with power supply terminals F-1 and F-2 for supplying power to the driver control circuit DC and the driver IC group DG via the diodes D-1 and D-2. Furthermore, the normal-luminance power supplies NB-1 and NB-2 are respectively provided with terminals G-1 and G-2 connected to a ground potential GND.

The diodes D-1 and D-2 are favorably diode circuits using metal-oxide-semiconductor field-effect transistor (MOSFETs) or the like because power loss is increased in simple diodes.

The driver control circuit DC receives a video signal for causing an individual LED constituting the LED display to emit light, and drives a driver IC for causing the individual LED constituting the corresponding driver IC group DG to emit light.

In the display unit DU of FIG. 2, in a case where any of the normal-luminance power supplies NB-1 and NB-2 has an abnormality and does not function, the diodes D-1 and D-2 respectively separate the normal-luminance power supplies from the driver control circuit DC and the driver IC group DG, so that the power supply can be continued in a range of the normal luminance by the other having no abnormality.

However, due to a simple circuit configuration, the power capacity for driving the high-luminance LED cannot be interchanged, and the power supply to the driver IC group DG (LEDs) remains in the power supply corresponding to normal luminance.

That is, in a case where an abnormality occurs in either one, power interchange corresponding to high luminance cannot be performed regardless of the occurrence of an abnormality although power supply redundancy (power supply by only one of the two normal-luminance power supplies NB in the case where the other is abnormal) can be achieved.

Moreover, in a case of adding a special balance circuit (not illustrated) to implement a large capacity corresponding to high luminance by two normal-luminance power supplies, the two normal-luminance power supplies can function as a large capacity power supply. However, since a configuration is substantially equivalent to a circuit configuration in which a resistor is inserted to balance voltage, a power loss is large. In addition, when an abnormality occurs in one of the normal-luminance power supplies and the power is supplied only by the other normal-luminance power supply, the other one normal-luminance power supply needs to cover the power necessary for the high luminance. Therefore, there is a possibility that overpower (overcurrent) occurs and the operation of the display unit stops.

Therefore, the present disclosure performs sharing control of the two normal-luminance power supplies so as to have the same current value, and supplies the power in parallel, thereby implementing the power supply corresponding to high luminance.

Furthermore, each of the two normal-luminance power supplies has a function to detect an abnormal operation when a failure occurs, and outputs an abnormality detection signal when detecting an abnormality, and when the abnormality detection signal is output from one of the two normal-luminance power supplies, the power supply is temporarily stopped by turning off a power supply switch that stops the power supply to the driver IC group DG. After a light emission mode is switched from a high-luminance mode to a normal-luminance mode, the power supply switch is turned on to resume the power supply to enable the display to be continued in the normal-luminance mode, whereby the power supply redundancy is implemented.

Figure 3:
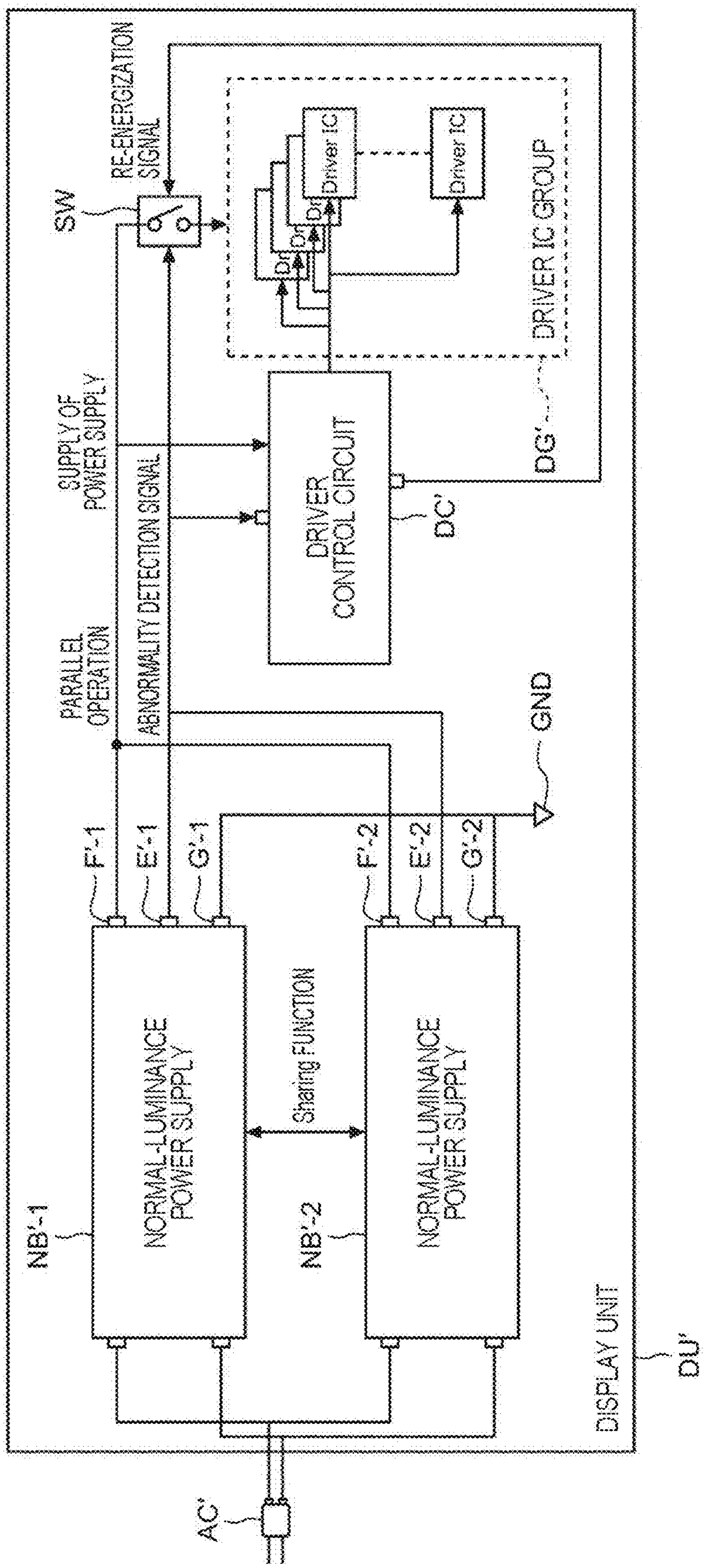
FIG. 3 is a diagram for describing an outline of a display unit of the present disclosure.

More specifically, as illustrated in FIG. 3, a display unit DU' of the present disclosure includes normal-luminance power supplies NB'-1 and NB'-2, a driver control circuit DC', a driver IC group DG', and a power supply switch SW.

Note that the normal-luminance power supplies NB'-1 and NB'-2, the driver control circuit DC', and the driver IC group DG' of the display unit DU' in FIG. 3 have configurations corresponding to the normal-luminance power supplies NB-1 and NB-2, the driver control circuit DC, and the driver IC group DG of the display unit DU in FIG. 2, respectively, and basically have the same functions.

That is, the display unit DU' of FIG. 3 is different from the display unit DU of FIG. 2 in that the diodes D-1 and D-2 are omitted, the power supply switch SW is added, and the normal-luminance power supplies NB'-1 and NB'-2 are subjected to sharing control so as to have same current value and supply the power in parallel to function as the power supplies corresponding to high luminance.

Moreover, the normal-luminance power supplies NB'-1 and NB'-2 are respectively provided with terminals F'-1 and F'-2 and terminals G'-1 and G'-2 corresponding to the terminals F-1 and F-2 for supplying power of the normal-luminance power supplies NB-1 and NB-2 and the terminals G-1 and G-2 connected to the ground in FIG. 2, and are newly provided with terminals E'-1 and E'-2 for outputting the abnormality detection signal.

When detecting that any abnormality has occurred in each of the normal-luminance power supplies NB'-1 and NB'-2, the normal-luminance power supply NB'-1 or NB'-2 supplies the abnormality detection signal to the power supply switch SW and the driver control circuit DC' from terminal E'-1 or E'-2.

When the abnormality detection signal is supplied from any of the terminals E'-1 and E'-2 of the normal-luminance power supplies NB'-1 and NB'-2, the power supply switch SW turns off a connection state to stop the power supply from the terminals F'-1 and F'-2 of the normal-luminance power supplies NB'-1 and NB'-2 to the driver IC group DG'.

Furthermore, when receiving supply of a re-energization signal from the driver control circuit DC' after turning off the connection by the supply of the abnormality detection signal, the power supply switch SW turns on the connection to resume the power supply from the terminals F'-1 and F'-2 to the driver IC group DG'.

When the abnormality detection signal is supplied from any of the terminals E'-1 and E'-2 of the normal-luminance power supplies NB'-1 and NB'-2, the driver control circuit DC' switches the light emission mode, which is the operation mode of light emission control of the driver IC group DG', from the high-luminance mode of supplying the power corresponding to high luminance to the normal-luminance mode of performing the light emission control with normal luminance, and then supplies the re-energization signal to the power supply switch SW.

The light emission mode is a mode of a luminance range when the LED emits light, and includes the normal-luminance mode and the high-luminance mode. The high-luminance mode is a mode of emitting light in the luminance range wider on a high luminance side than the luminance range when light emission is controlled in the normal-luminance mode. The present disclosure performs the sharing control so as to have the same current value output from both the normal-luminance power supplies NB'-1 and NB'-2 unless there is abnormality in both the normal-luminance power supplies, thereby implementing a large-capacity power supply, and implementing light emission in the high-luminance mode.

That is, with the configuration as illustrated in FIG. 3, in the present disclosure, when the abnormality detection signal is detected from any of the two normal-luminance power supplies NB'-1 and NB'-2, the power supply switch SW is turned off, and the power supply to the driver IC group DG' is temporarily stopped to stop the display.

Moreover, after the light emission mode is switched from the high-luminance mode to the normal-luminance mode by the driver control circuit DC' in the state where the display is stopped, the re-energization signal is supplied to the power supply switch SW, and the power supply switch SW is turned on, so that the display in the normal-luminance mode is resumed.

Here, as described above, when the abnormality detection signal is detected from the terminal E'-1 or E'-2 of the normal-luminance power supply NB'-1 or NB'-2, the power supply switch SW is turned off, and the power supply is stopped, so that the display is temporarily stopped.

However, a period required after the light emission mode is switched from the high-luminance mode to the normal-luminance mode by the driver control circuit DC', the re-energization signal is supplied to the power supply switch SW, and the power supply switch is turned on to resume the power supply is about several frames, and thereafter, the display in the normal-luminance mode is resumed, so that the display is substantially continued. More specifically, in a case where a frame rate is 60 fps, when the period required after the power supply is stopped to when the power supply is resumed is about 100 ms, for example, the display is stopped for about 6 frames, and the display may be seen by a user as flickering for a moment, but the display does not seem to be stopped, and the display state is continued.

Thereby, it is possible to implement the power supply in the high-luminance mode while suppressing an increase in size of the housing, and to continue the display in the normal-luminance mode even in the case where an abnormality occurs in any of the plurality of normal-luminance power supplies, and to implement the power supply redundancy.

2. Favorable Embodiment

<Configuration Example of Display System>

The present disclosure enables display to be continued even if an abnormality occurs in any of a plurality of power supply devices for normal luminance in a case where a power supply device for a high-luminance direct-view light emitting diode (LED) display is operated by the plurality of power supply devices for normal luminance.

Figure 4:
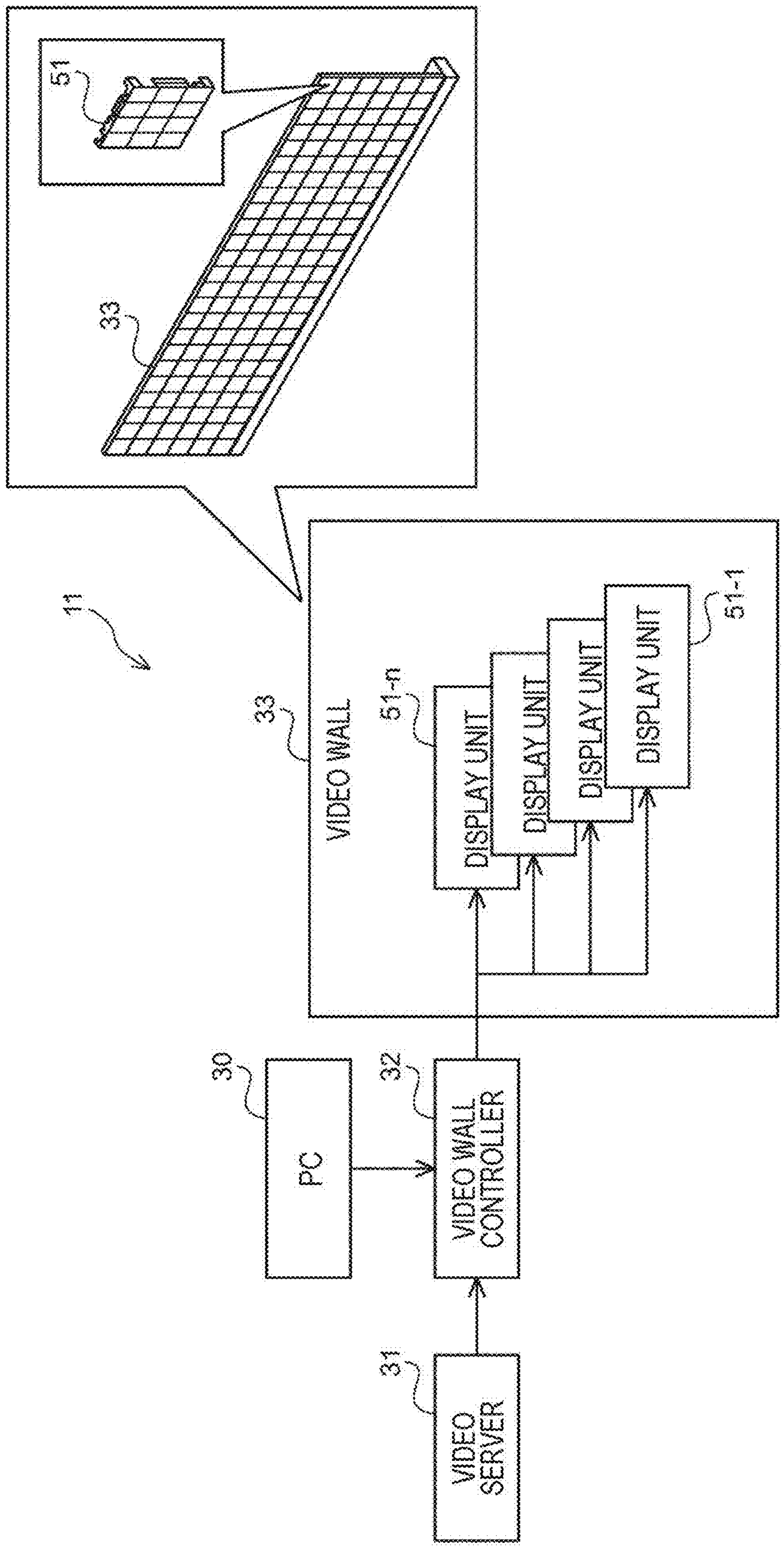
FIG. 4 is a diagram for describing a configuration example of a favorable embodiment of the display system of the present disclosure.

FIG. 4 illustrates a configuration example of a display system to which the technology of the present disclosure is applied.

A display system 11 in FIG. 4 displays video content on a large display (tiling display) configured by arranging a plurality of display units in an array.

More specifically, the display system 11 includes a personal computer (PC) 30, a video server 31, a video wall controller 32, and a video wall 33.

The personal computer (PC) 30 is a general-purpose computer, and receives an operation input by the user and supplies a command corresponding to a detail of the operation to the video wall controller 32. Furthermore, when an abnormality occurs in any of display units 51-1 to 51-*n* constituting the video wall 33, the PC 30 acquires information of the occurrence of an abnormality via the video wall controller 32 and presents the information to the user.

The video server 31 includes, for example, a server computer or the like, and supplies data of a video signal such as video content to the video wall controller 32.

The video wall controller 32 operates in response to the command supplied from the PC 30, and distributes the data of the video signal of the video content among the display units 51-1 to 51-*n* constituting the video wall 33 to cause the display units 51-1 to 51-*n* to display the data.

Note that, in a case where there is no need to individually distinguish the display units 51-1 to 51-*n*, the display units 51-1 to 51-*n* are simply referred to as display unit(s) 51.

As illustrated in the upper right part of FIG. 4, the video wall 33 includes the display units 51-1 to 51-*n* arranged in an array, the display units 51-1 to 51-*n* each having pixels including LEDs arranged in an array, and images individually displayed by the display units 51 are combined in a tile so that one entire image is displayed on the video wall 33.

The video wall controller 32 applies predetermined signal processing to the data of the video signal of the video content supplied from the video server 31, distributes and supplies the data in accordance with the arrangement of the display units 51-1 to 51-*n*, controls their respective displays of the display units 51-1 to 51-*n*, and controls the video wall 33 to display one entire image.

Note that the video wall controller 32 and the video wall 33 may be integrated with each other, or may be integrated into a display device (information processing system).

<Detailed Configuration of Video Wall Controller>

Next, a detailed configuration example of the video wall controller 32 will be described with reference to FIG. 5.

The video wall controller 32 includes a local area network (LAN) terminal 71, a high definition multimedia interface (HDMI) (registered trademark) terminal 72, a display port (DP) terminal 73, a digital visual interface (DVI) terminal 74, a network interface (IF) 75, a micro processor unit (MPU) 76, a signal input IF 77, a signal processing unit 78, a dynamic random access memory (DRAM) 79, a signal distribution unit 80, and signal IFs 81-1 to 81-*n*.

The local area network (LAN) terminal 71 is, for example, a connection terminal of a LAN cable or the like, and the LAN terminal 71 establishes communication with the personal computer (PC) 30 over a LAN, the personal computer (PC) 30 being operated by the user to supply a control command or the like corresponding to a detail of the operation to the video wall controller 32, and supplies the input control command or the like to the MPU 76 via the network IF 75.

Note that the LAN terminal 71 may have a configuration adapted to physical connection with a wired LAN cable, or may have a configuration adapted to connection with a so-called wireless LAN implemented by wireless communication.

The MPU 76 receives the input of the control command supplied from the PC 30 via the LAN terminal 71 and the network IF 75, and supplies a control signal corresponding to the received control command to the signal processing unit 78.

The HDMI terminal 72, the DP terminal 73, and the DVI terminal 74 each serves as an input terminal of the data of the video signal, and is connected to, for example, a server computer functioning as the video server 31, and supplies the data of the video signal to the signal processing unit 78 via the signal input IF 77.

Note that, although FIG. 2 illustrates an example where the video server 31 and the HDMI terminal 72 are connected, any of the HDMI terminal 72, the DP terminal 73, or the DVI terminal 74 may be selected and connected as necessary because the HDMI terminal 72, the DP terminal 73, and the DVI terminal 74 have different standards but basically have similar functions. Furthermore, the terminal is not limited to the HDMI, DP, and DVI standards, and a terminal according to a standard other than the HDMI, DP, and DVI standards may be provided, and any of them may be selected and connected.

The signal processing unit 78 adjusts color temperature, contrast, brightness, and the like of the data of the video signal supplied via the signal input IF 77 on the basis of the control signal supplied from the MPU 76, and supplies the data to the signal distribution unit 80. At this time, the signal processing unit 78 develops the data of the video signal in the connected DRAM 79, executes signal processing based on the control signal, and supplies a result of the signal processing to the signal distribution unit 80 as necessary.

The signal distribution unit 80 distributes the data of the video signal subjected to the signal processing and supplied from the signal processing unit 78 and individually distributes and transmits the data to the display units 51-1 to 51-*n* via the signal IFs 81-1 to 81-*n*.

When executing the signal processing based on the control signal, the signal processing unit 78 executes the signal processing, assuming that the light emission mode is the high-luminance mode by default, that is, so as to obtain the luminance range corresponding to high luminance, and supplies the signal processing result to the signal distribution unit 80.

Furthermore, when the video wall 33 notifies that an abnormality is detected in any of the power supplies of the display unit 51 via the signal IF 81 and the signal distribution unit 80, the signal processing unit 78 switches the light emission mode from the high-luminance mode to the normal-luminance mode, executes the signal processing, and supplies the signal processing result to the signal distribution unit 80.

Moreover, when the video wall 33 notifies that an abnormality is detected in any of the power supplies of the display unit 51, the signal processing unit 78 supplies the information of the notification to the PC 30 via the MPU 76, the network IF 75, and the LAN terminal 71. At this time, the PC 30 presents to the user that an abnormality has occurred in any of the power supplies of the display unit 51 from the video wall 33.

Note that, in a case where an abnormality has occurred in all the power supplies provided in any of the display units 51 of the video wall 33, the display on the display unit 51 is disabled. Therefore, the PC 30 may present that the display is disabled, that is, a black screen is displayed. Furthermore, the presentation based on the occurrence of an abnormality in the power supply may be performed by the video wall controller 32.

<Detailed Configuration of Display Unit>

Figure 6:
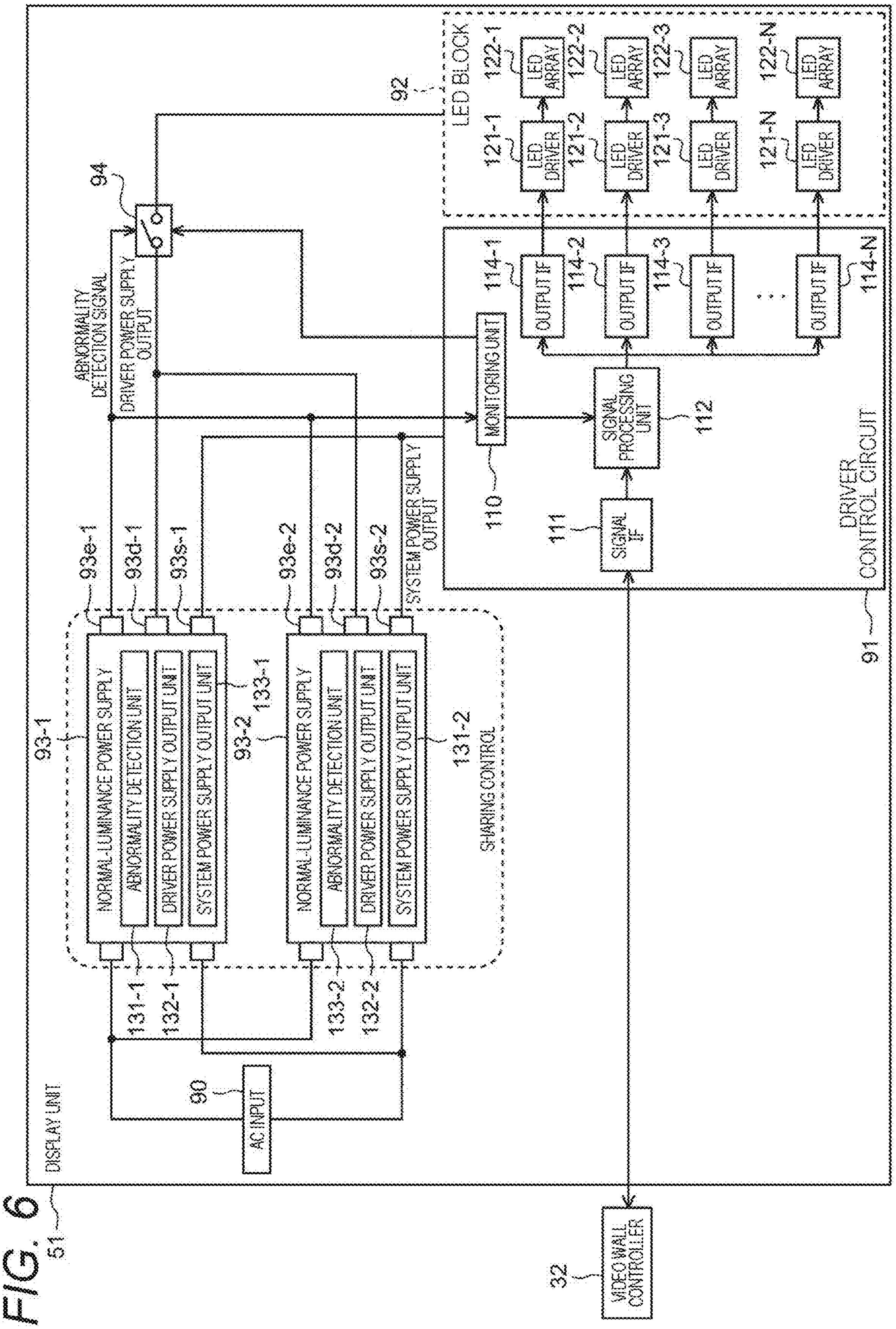
FIG. 6 is a diagram for describing a configuration example of a display unit in FIG. 4.

Next, a detailed configuration example of the display unit 51 will be described with reference to FIG. 6.

The display unit 51 includes an AC input 90, a driver control circuit 91, an LED block 92, normal-luminance power supplies 93-1 and 93-2, and a power supply switch 94.

The driver control circuit 91 is driven by a system power supply output supplied from terminals 93*s*-1 and 93*s*-2 of the power output from the normal-luminance power supplies 93-1 and 93-2. The driver control circuit 91 supplies the data of the video signal for controlling light emission of LEDs constituting LED arrays 122-1 to 122-N to a plurality of LED drivers 121-1 to 121-N constituting the LED block 92.

In a case where the abnormality detection signal is not output from any of the normal-luminance power supplies 93-1 and 93-2, the driver control circuit 91 sets the light emission mode to the high-luminance mode, and supplies, to the plurality of LED drivers 121-1 to 121-N constituting the LED block 92, the data of the video signal for emitting light of the LEDs constituting the LED arrays 122-1 to 122-N with high luminance in a wider luminance range on a high luminance side than the normal luminance.

In a case where the abnormality detection signal is output from at least one of the normal-luminance power supplies 93-1 and 93-2, the driver control circuit 91 switches the light emission mode from the high-luminance mode to the normal-luminance mode of emitting light with normal luminance, and supplies, to the plurality of LED drivers 121-1 to 121-N constituting the LED block 92, the data of the video signal for emitting light of the LEDs constituting the LED arrays 122-1 to 122-N with normal luminance.

Furthermore, in the case where the abnormality detection signal is output from at least one of the normal-luminance power supplies 93-1 and 93-2, the power supply switch 94 controls the connection to be turned off to stop the driving of the LED block 92. At this time, after changing the light emission mode from the high-luminance mode to the normal-luminance mode, the driver control circuit 91 controls the power supply switch 94 to be turned on to resume the driving of the LED block 92.

More specifically, the driver control circuit 91 includes a monitoring unit 110, a signal IF 111, a signal processing unit 112, a DRAM 113, and output IFs 114-1 to 114-N.

The signal IF 111 receives the input of the data of the video signal supplied from the video wall controller 32 and supplies the data to the signal processing unit 112.

The signal processing unit 112 corrects color and luminance for each display unit 51 on the basis of the data of the video signal supplied from the signal IF 111, generates data for setting light emission intensity of each LED constituting the LED arrays 122-1 to 122-N, and distributes and supplies the data to the LED drivers 121-1 to 121-N of the LED block 92 via the output IFs 114-1 to 114-N.

The LED block 92 includes the LED drivers 121-1 to 121-N and the LED arrays 122-1 to 122-N.

The LED drivers 121-1 to 121-N perform control of the light emission of the LEDs arranged in an array constituting the corresponding LED arrays 122-1 to 122-N on the basis of the data for setting the light emission intensity of the LEDs 141, the data containing the video signal supplied from the driver control circuit 91.

The AC input 90 supplies power of an alternating current (AC) power supply to each of the normal-luminance power supplies 93-1 and 93-2.

Each of the normal-luminance power supplies 93-1 and 93-2 is a power supply device used in the display unit including the LED display corresponding to the normal luminance, and the sharing control is performed so as to have the same current value to be output on the basis of the AC input 90. The power is supplied from each of the terminals 93*s*-1 and 93*s*-2 to the driver control circuit 91, and the power is supplied from each of terminals 93*d*-1 and 93*d*-2 to the LED block 92 via the power supply switch 94.

When detecting its own abnormality, the normal-luminance power supply 93-1 or 93-2 outputs the abnormality detection signal from a terminal 93*e*-1 or 93*e*-2 to the driver control circuit 91 and the power supply switch 94.

More specifically, the normal-luminance power supplies 93-1 and 93-2 respectively include abnormality detection units 131-1 and 131-2, driver power supply output units 132-1 and 132-2, and system power supply output units 133-1 and 133-2.

Each of the abnormality detection unit 131-1 and 131-2 monitors the power supply of the normal-luminance power supply 93-1 or 93-2, and temperature and occurrence of abnormality such as ignition, and outputs the abnormality detection signal as a status signal to the driver control circuit 91 and the power supply switch 94 from the terminal 93*e*-1 or 93*e*-2 when abnormality is detected.

Each of the driver power supply output units 132-1 and 132-2 supplies a driver power supply output from the terminal 93*d*-1 or 93*d*-2 to the driver control circuit 91 via the power supply switch 94.

Therefore, the power is supplied to the driver control circuit 91 when the power supply switch 94 is turned on, and the power supply to the driver control circuit 91 is stopped when the power supply switch 94 is turned off, by the driver power supply outputs from the terminals 93*d*-1 and 93*d*-2.

Each of the system power supply output units 133-1 and 133-2 supplies a system power supply output from the terminal 93*s*-1 or 93*s*-2 to the driver control circuit 91.

Note that each of the normal-luminance power supplies 93-1 and 93-2 is a power supply device used in the display unit including the LED display corresponding to the normal luminance. Therefore, in a case where the normal-luminance power supply is used alone, sufficient power supply can be performed when the display unit 51 of the present disclosure is used in the normal-luminance mode, but the power supply capacity is insufficient depending on a luminance level of the video signal and there is a possibility that the display unit 51 goes down due to overcurrent when the display unit 51 is used in the high-luminance mode.

The power supply switch 94 is a switch that controls on/off, such as a MOS-FET, for example, and provided on the path that connects the terminals 93*d*-1 and 93*d*-2 of the normal-luminance power supplies 93-1 and 93-2 and the driver control circuit 91 and to which the driver power supply output is supplied.

The power supply switch 94 controls the connection to be on as long as the normal state in which the abnormality detection signal is not supplied from the terminal 93*e*-1 or 93*e*-2 is continued at the same time as the power supply is turned on, and controls the connection to be off when the abnormality detection signal is supplied from the terminal 93*e*-1 or 93*e*-2 and shifts to the abnormal state.

The power supply switch 94 controls itself to be turned off, continues the off state after shifting to the abnormal state, and thereafter controls itself to be turned on again when a re-energization signal is supplied from the driver control circuit 91 and returns to the normal state.

The monitoring unit 110 monitors whether or not the abnormality detection signal is supplied from the terminals 93*e*-1 and 93*e*-2.

When the abnormality detection signal is supplied from the terminal 93*e*-1 or 93*e*-2, the monitoring unit 110 detects the abnormal state and notifies the signal processing unit 112 that an abnormality has occurred in the normal-luminance power supply 93-1 or 93-2.

When the occurrence of abnormality in the normal-luminance power supply 93-1 or 93-2 is notified, the signal processing unit 112 switches the light emission mode from the high-luminance mode to the normal-luminance mode in which light is emitted with normal luminance. That is, the signal processing unit 112 switches the light emission mode from the high-luminance mode to the normal-luminance mode and generates the data in generating the data for setting the light emission intensity (luminance) of each LED constituting the LED arrays 122-1 to 122-N, and distributes and supplies the data to the LED drivers 121-1 to 121-N of the LED block 92 via the output IFs 114-1 to 114-N.

That is, when the abnormality detection signal is supplied from the terminal 93*e*-1 or 93*e*-2 to be in the abnormal state, the power is not supplied from at least one of the normal-luminance power supplies 93-1 and 93-2. Therefore, when the light of the LED is to be emitted in the luminance range in the high-luminance mode, there is a possibility that the light cannot be emitted due to overcurrent. Therefore, by switching the light emission mode from the high-luminance mode to the normal-luminance mode, the light emission intensity (luminance) is set to the luminance range of the normal-luminance mode, and driving can be performed with the power supplied from one normal-luminance power supply 93.

The monitoring unit 110 supplies the re-energization signal to the power supply switch 94 at timing after the light emission mode in the signal processing unit 112 is switched from the high-luminance mode to the normal-luminance mode, for example, at timing after a period of about several frames.

The power supply switch 94 turns on the operation on the basis of the re-energization signal from the monitoring unit 110 of the driver control circuit 91 to resume the power supply to the LED block 92 and resume the light emission of the LEDs in the LED block 92.

At this time, the light emission of the LEDs in the LED block 92 continues in the normal-luminance mode.

With such a configuration, even in the case where an abnormality occurs in any of the normal-luminance power supplies 93-1 and 93-2, the power supply to the LED block 92 is stopped by turning off the power supply switch 94. Therefore, even if the driver control circuit 91 controls the light emission in the high-luminance mode, it is possible to avoid a situation where the display unit goes down due to overpower (overcurrent).

Furthermore, after the light emission mode is switched from the high-luminance mode to the normal-luminance mode in the state where the power supply switch 94 is turned off and the power supply to the LED block 92 is stopped, the power supply switch 94 is controlled to be turned on again, so that the light emission is continued in the normal-luminance mode in which the overpower (overcurrent) does not occur. Therefore, it is possible to realize the power redundancy.

Moreover, even in a configuration in which the plurality of display units 51 is connected like a daisy chain and video signals are sequentially transmitted, it is possible to reduce a risk that the video signal is not transmitted to the subsequent display unit 51 as the display unit 51 goes down due to overcurrent.

Note that, in the above description, the display unit 51 has been described as having a configuration including the LED drivers 121-1 to 121-N and the LED arrays 122-1 to 122-N, but the present embodiment is not limited thereto. The display unit 51 may include only one LED array 122-1 as the LED array, or may include only one LED driver 121-1 as the LED driver. Furthermore, the display unit 51 may not be a direct-view LED display, and may be, for example, a liquid crystal display using an LED backlight. Furthermore, the LEDs of the LED arrays 122-1 to 122-N may be organic LEDs (OLEDs).

<Display Processing>

Figure 7:
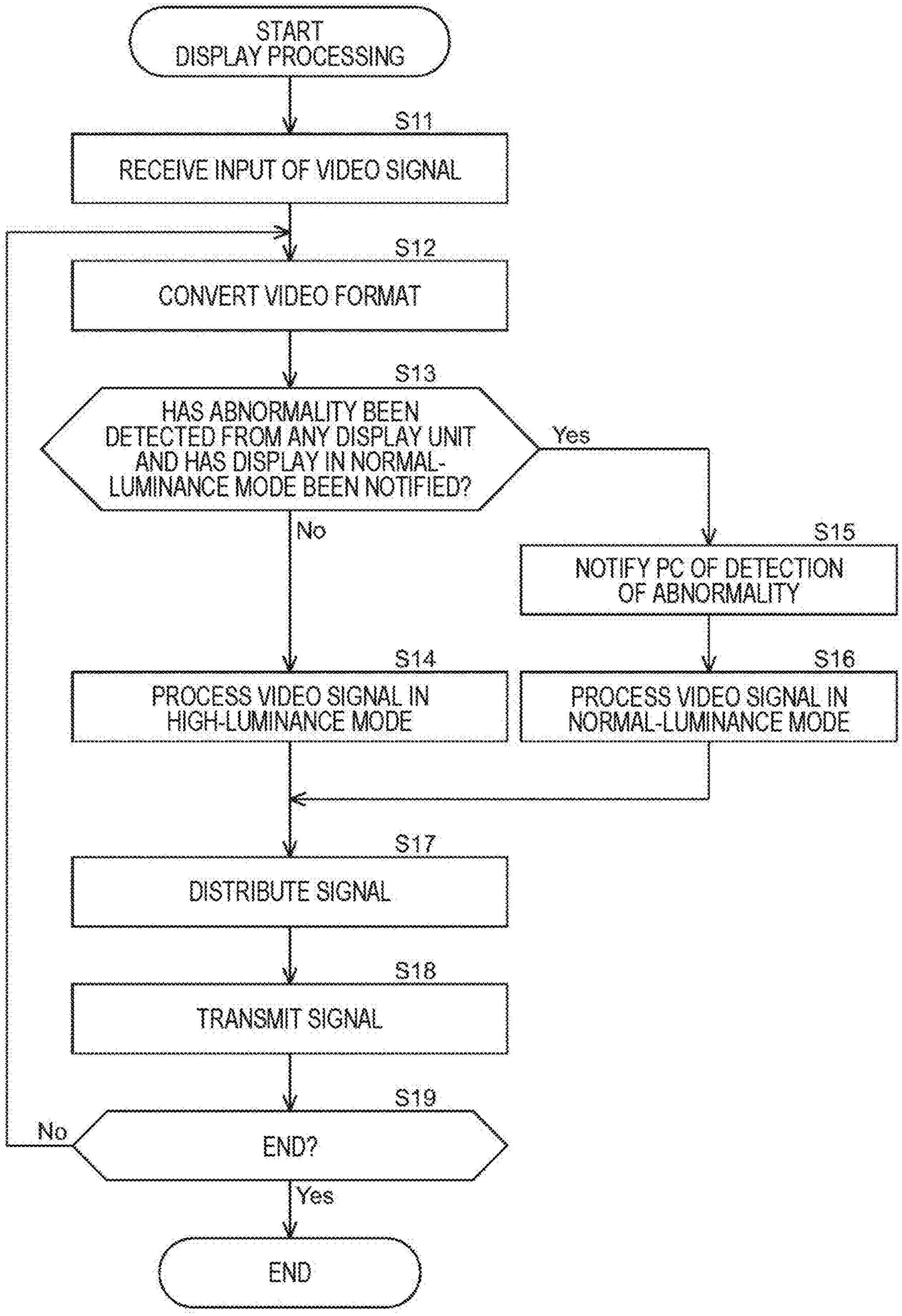
FIG. 7 is a flowchart for describing display processing by the display system in FIG. 4.

Next, display processing performed by the display system 11 in FIGS. 4 to 6 will be described with reference to the flowchart in FIG. 7.

In step S11, the signal processing unit 78 receives an input of the video signal containing content data and the like supplied from the video server 31 via any of the HDMI terminal 72, the DP terminal 73, or the DVI terminal 74, and the signal input IF 77.

In step S12, the signal processing unit 78 converts a video format of the received video signal.

In step S13, the signal processing unit 78 determines whether or not an abnormality is detected from any of the display units 51-1 to 51-*n* and display in the normal-luminance mode has been notified via the signal distribution unit 80 and the signal IFs 81-1 to 81-*n*.

In step S13, in a case where it is determined that no abnormality is detected from any of the display units 51-1 to 51-*n* and display in the normal-luminance mode has not been notified, the processing proceeds to step S14.

In step S14, the signal processing unit 78 receives the input of the control signal supplied from the MPU 76, the control signal being supplied in accordance with a detail of an operation made on the PC 30, and executes the signal processing for color temperature, contrast, brightness, and the like in the high-luminance mode.

In step S17, the signal processing unit 78 allocates and distributes the video signal subjected to the signal processing to the display units 51-1 to 51-*n* of the video wall 33.

In step S18, the signal processing unit 78 transmits and outputs the distributed video signal to each of the display units 51-1 to 51-*n* of the corresponding video wall 33.

In step S19, it is determined whether or not termination of the processing has been instructed, and in a case where the termination of the processing has not been instructed, the processing returns to step S11, and the subsequent processing is repeated.

Then, in step S19, in a case where it is determined that the termination has been instructed, the processing ends.

On the other hand, in step S13, in a case where it is determined that an abnormality is detected from any of the display units 51-1 to 51-*n* and display in the normal-luminance mode has been notified, the processing proceeds to step S15.

In step S15, the signal processing unit 78 notifies the PC 30 of information indicating that an abnormality has occurred in any of the display units 51-1 to 51-*n* through the MPU 76, the network IF 75, and the LAN 71. Thereby, the PC 30 presents the information indicating that an abnormality has occurred in any of the display units 51-1 to 51-*n* to the user.

In step S16, the signal processing unit 78 receives the input of the control signal supplied from the MPU 76, the control signal being supplied in accordance with a detail of an operation made on the PC 30, and executes the signal processing for color temperature, contrast, brightness, and the like in the normal-luminance mode, and the processing proceeds to step S17.

In a case where no abnormality is detected in any of the display units 51-1 to 51-*n* through the above series of processing, the video signal read from the video server 31 is subjected to the signal processing in the high-luminance mode, and is distributed and transmitted among the display units 51-1 to 51-*n* constituting the video wall 33 so as to allow the display units 51-1 to 51-*n* to display respective videos, thereby allowing the video wall 33 to display the entire video of the video content in the high-luminance mode.

Furthermore, when detection of an abnormality from any of the display units 51-1 to 51-*n* is notified, the information indicating that an abnormality is detected is presented to the user of the PC 30, so that the user can recognize that an abnormality has occurred in the display unit 51.

Furthermore, when detection of an abnormality is notified from any of the display units 51-1 to 51-*n*, the video signal read from the video server 31 is subjected to the signal processing in the normal-luminance mode, and is distributed and transmitted among the display units 51-1 to 51-*n* constituting the video wall 33 so as to allow the display units 51-1 to 51-*n* to display respective videos, thereby allowing the video wall 33 to display the entire video of the video content in the normal-luminance mode.

That is, in this case, as will be described below, the display unit 51 in which an abnormality is detected switches the display from the high-luminance mode to the normal-luminance mode and performs display. When the display unit 51 having no abnormality continues the display in the high-luminance mode, the display of only the display unit 51 in which an abnormality has occurred is performed in the normal-luminance mode, so that only the display in the display unit 51 in which an abnormality has occurred is darkly displayed.

However, in the present disclosure, when an abnormality is detected in any of the display units 51, the display is switched from the high-luminance mode to the normal-luminance mode even in the display unit 51 without an abnormality, and all the display units 51 perform the display in the normal-luminance mode. Therefore, it is possible to continue the display while preventing only the display of the display unit 51 in which an abnormality has occurred from being darkly displayed.

Figure 8:
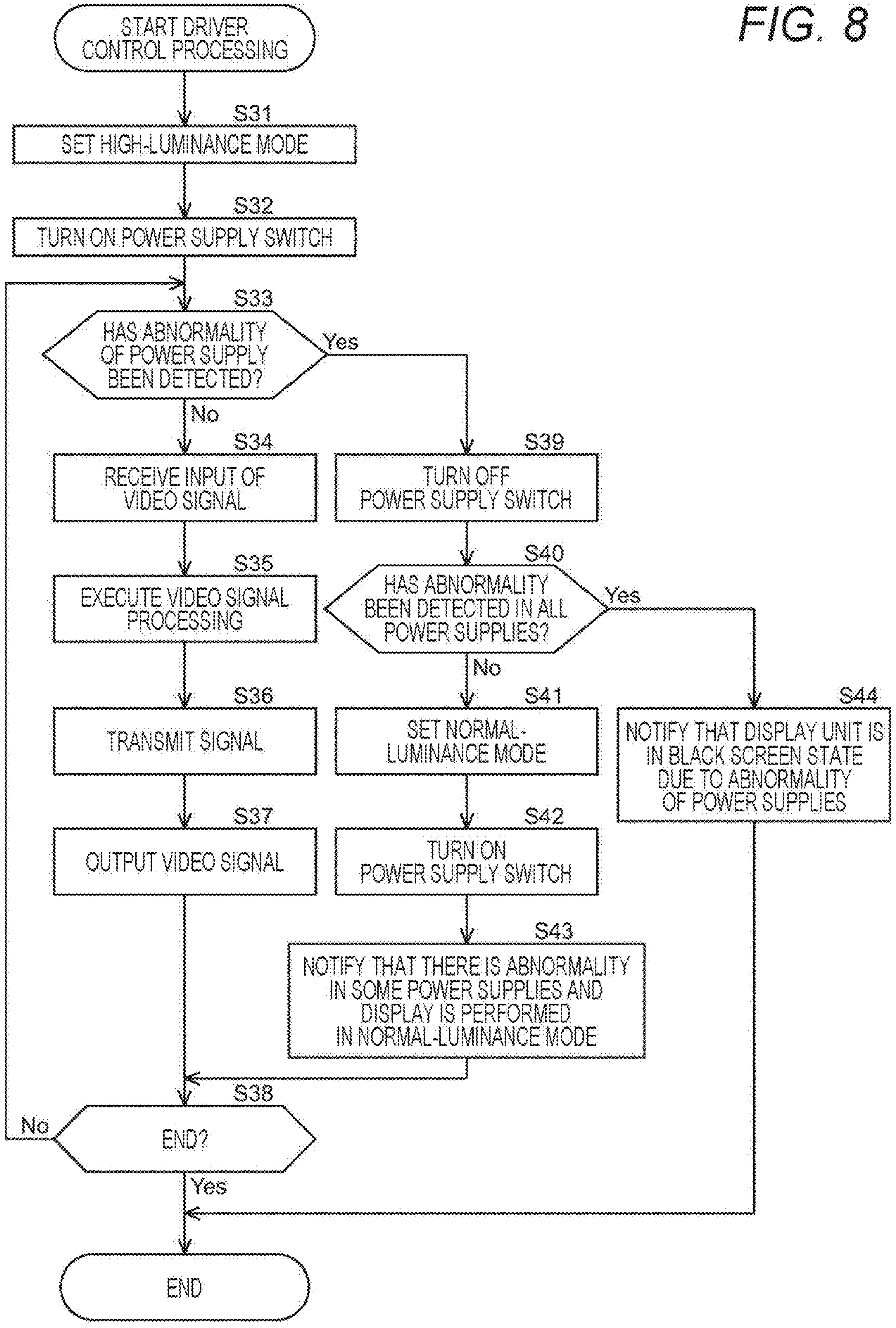
FIG. 8 is a flowchart for describing driver control processing by the display system in FIG. 4.

Note that when an abnormality is detected in any of the display units 51, the light emission mode in the display unit 51 having no abnormality remains in the high-luminance mode in driver control processing to be described below with reference to FIG. 8.

However, since the processing for the video signal in the video wall controller 32 is set to the normal-luminance mode, all the video signals distributed and supplied to all the display units 51 of the video wall 33 are in the luminance range defined in the normal-luminance mode.

As a result, the light emission mode in the display unit 51 having no abnormality remains the high-luminance mode, but the video signal is generated in the luminance range defined in the normal-luminance mode. Therefore, the displayed image is also the image in the luminance range of the normal-luminance mode, and all the display units 51 display the images in the normal-luminance mode.

Note that a plurality of the video wall controllers 32 may be used to control the video wall 33. At this time, the light emission mode may be controlled to be common among the plurality of video wall controllers 32 by communication between the video wall controllers 32 or communication via the PC 30. As a result, even in a case where the video wall 33 is controlled using the plurality of video wall controllers 32, all the display units 51 of the video wall 33 are displayed in the normal-luminance mode, so that it is possible to continue the display while preventing only the display of the display unit 51 in which an abnormality has occurred from being darkly displayed.

<Driver Control Processing in Display Unit>

Next, the driver control processing performed in the display unit 51 will be described with reference to a flowchart in FIG. 8.

Note that this processing is based on the assumption that the normal-luminance power supplies 93-1 and 93-2 are subjected to sharing control, and the driver power supply output is supplied from the terminals 93*d*-1 and 93*d*-2 to the LED block 92 via the power supply switch 94, and the system power supply output is supplied from the terminals 93*s*-1 and 93*s*-2 to the driver control circuit 91 on the basis of the AC power supplied from the AC input 90.

In step S31, the signal processing unit 112 in the driver control circuit 91 of the display unit 51 sets the light emission mode to the high-luminance mode.

In step S32, the monitoring unit 110 in the driver control circuit 91 of the display unit 51 controls the power supply switch 94 to be turned on.

In step S33, the monitoring unit 110 determines whether or not the abnormality detection signal indicating that an abnormality has occurred is supplied from at least one of the terminals 93*e*-1 and 93*e*-2 of the normal-luminance power supplies 93-1 and 93-2.

In step S33, in a case where it is determined that the abnormality detection signal is not supplied from any of the terminals 93*e*-1 and 93*e*-2 of the normal-luminance power supplies 93-1 and 93-2, the processing proceeds to step S34.

In step S34, the signal processing unit 112 receives the input of the video signal distributed by and supplied from the video wall controller 32 in units of rows via the signal IF 111.

In step S35, the signal processing unit 112 executes the video signal processing of correcting color, luminance, and the like corresponding to each of the display units 51 for the video signal in units of rows distributed among the display units 51 in the set light emission mode. That is, when the light emission mode is the high-luminance mode, the video signal processing is performed in the high-luminance mode, and when the light emission mode is the normal-luminance mode, the video signal processing is performed in the normal-luminance mode.

In step S36, the signal processing unit 112 allocates the video signal in units of rows subjected to the video signal processing to the LED drivers 121-1 to 121-N of the LED block 92, and transmits the video signals via the corresponding output IFs 114-1 to 114-N.

In step S37, the LED drivers 121-1 to 121-N of the LED block 92 execute LED drive control processing on the basis of the video signal in units of rows, and each of the LED arrays 122-1 to 122-N displays a video in units of rows with appropriate luminance.

In step S38, it is determined whether or not termination of the processing has been instructed, and in a case where the termination of the processing has not been instructed, the processing returns to step S33, and the subsequent processing is repeated.

Then, in step S38, when the termination of the processing is instructed, the processing ends.

That is, in the case where no abnormality is detected in any of the normal-luminance power supplies 93-1 and 93-2, the LED arrays 122-1 to 122-N display the video in units of rows with appropriate luminance in the high-luminance mode.

On the other hand, in step S33, in the case where it is determined that an abnormality is detected in any of the normal-luminance power supplies 93-1 and 93-2, the processing proceeds to step S39.

In step S39, the power supply switch 94 turns off the connection on the basis of the abnormality detection signal, stops the power supply to the LED block 92, and stops the display.

In step S40, the monitoring unit 110 determines whether or not an abnormality is detected in all the normal-luminance power supplies 93-1 and 93-2.

In step S40, in a case where an abnormality is not detected in all the normal-luminance power supplies 93-1 and 93-2 and an abnormality is detected in either one of them, the processing proceeds to step S41.

In step S41, the monitoring unit 110 notifies the signal processing unit 112 of the information indicating that an abnormality is detected. With this notification, the signal processing unit 112 sets the light emission mode to the normal-luminance mode.

In step S42, the monitoring unit 110 supplies the re-energization signal to the power supply switch 94, controls the power supply switch 94 to be turned on, resumes the power supply to the LED block 92, and resumes the display.

In step S43, the signal processing unit 112 controls the signal IF 111 to notify the video wall controller 32 that there is an abnormality in some normal-luminance power supply 93 of the display unit 51 and the LED block 92 is displayed in the normal-luminance mode, and the processing returns to step S38.

That is, when an abnormality is detected in any of the normal-luminance power supplies 93-1 and 93-2, the LED arrays 122-1 to 122-N display the video in units of rows with appropriate luminance in the normal-luminance mode in the subsequent processing.

Furthermore, at this time, the video wall controller 32 is notified that an abnormality is detected in any of the normal-luminance power supplies 93-1 and 93-2 and the display is performed in the normal-luminance mode, and moreover, the PC 30 is notified of these pieces of information through the video wall controller 32, and the pieces of information are presented in the PC 30.

Moreover, in step S40, in the case where an abnormality is detected in all the normal-luminance power supplies 93-1 and 93-2, the processing proceeds to step S44.

In step S44, the signal processing unit 112 controls the signal IF 111 to notify the video wall controller 32 that there is an abnormality in all the normal-luminance power supplies 93 of the display unit 51, the display by the LED block 92 is stopped, and the black screen state is set, and the processing ends.

That is, when an abnormality is detected in both of the normal-luminance power supplies 93-1 and 93-2, the LED arrays 122-1 to 122-N are in an undisplayable state in the subsequent processing, and thus the video wall controller 32 is notified of the black screen state.

Furthermore, at this time, the video wall controller 32 is notified that an abnormality is detected in both the normal-luminance power supplies 93-1 and 93-2, the display is stopped, and the black screen state is set, and moreover, the PC 30 is notified of these pieces of information through the video wall controller 32, and the pieces of information are presented in the PC 30.

By the above processing, in the case where an abnormality is detected in any of the normal-luminance power supplies 93-1 and 93-2, the power supply to the LED arrays 122-1 to 122-N is stopped and the display is stopped, and the power supply is resumed after the light emission mode is switched from the high-luminance mode to the normal-luminance mode.

Since a period from the stop to the restart of the power supply is a period corresponding to a display time of several frames required for switching the light emission mode from the high-luminance mode to the normal-luminance mode, the display is substantially stopped only for an extremely short period, and thus the display is switched to the normal-luminance mode and continued.

Furthermore, as described above, when the display is performed in the normal-luminance mode, information of the display is notified to the video wall controller 32, and the video signal to be generated in the video wall controller 32 is generated in the normal-luminance mode in response to the notification, so that the video signal is displayed in the normal-luminance mode in all the display units 51 including the display unit 51 in which no abnormality has occurred.

Thereby, it is possible to avoid a display state in which only the display unit 51 in which an abnormality has occurred is displayed in the normal-luminance mode, and thus looks darker than the display unit 51 displayed in another high-luminance mode.

Moreover, when an abnormality is detected in any of the display units 51, the information indicating that the abnormality is detected is supplied from the video wall controller 32 to the PC 30 and is presented to the user, so that the user can recognize that an abnormality is detected in the display unit 51 even if the display is continued in the normal-luminance mode.

Note that, in the above configuration, an example has been described in which, when the abnormality detection signal is supplied, the power supply switch 94 controls itself to be turned off, changes the high-luminance mode to the normal-luminance mode, and then controls itself to be turned on on the basis of the re-energization signal supplied from the monitoring unit 110.

However, the abnormality detection signal may not be supplied to the power supply switch 94, and on or off of the power supply switch 94 may be controlled by the monitoring unit 110.

That is, the abnormality detection signal may be supplied only to the monitoring unit 110 of the driver control circuit 91, and the monitoring unit 110 may turn off the power supply switch 94 when detecting the abnormality detection signal, and may turn on the power supply switch 94 again after the light emission mode is switched from the high-luminance mode to the normal-luminance mode. In this way, the control system of the power supply switch 94 can be integrated by the monitoring unit 110.

3. Application Example

In the above description, in the case where the abnormality detection signal is detected in any of the normal-luminance power supplies 93-1 and 93-2, the power supply switch 94 is turned off to stop the power supply, the display mode is switched from the high-luminance mode to the normal-luminance mode, and then the power supply switch 94 is turned on to resume the power supply.

However, in the case where the display mode is the high-luminance mode, even if an abnormality occurs in any of the normal-luminance power supplies 93-1 and 93-2, the overpower (overcurrent) does not occur even if the display is continued when the video signal itself supplied from the video wall controller 32 is in the luminance range displayable in the normal-luminance mode.

Therefore, even if an abnormality occurs in any of the normal-luminance power supplies 93-1 and 93-2, it is not always necessary to turn off the power supply switch 94 and switch the display mode from the high-luminance mode to the normal-luminance mode when the video signal itself is in the luminance range displayable in the normal-luminance mode.

Therefore, in the case where the light emission mode is the high-luminance mode, the abnormality detection signal may not be supplied to the power supply switch 94 even if the abnormality detection signal is detected in any of the normal-luminance power supplies 93-1 and 93-2 when the video signal is in the luminance range displayable even in the normal-luminance mode, and the abnormality detection signal may be supplied to the power supply switch 94 when the video signal is in the luminance range undisplayable in the normal-luminance mode.

Figure 9:
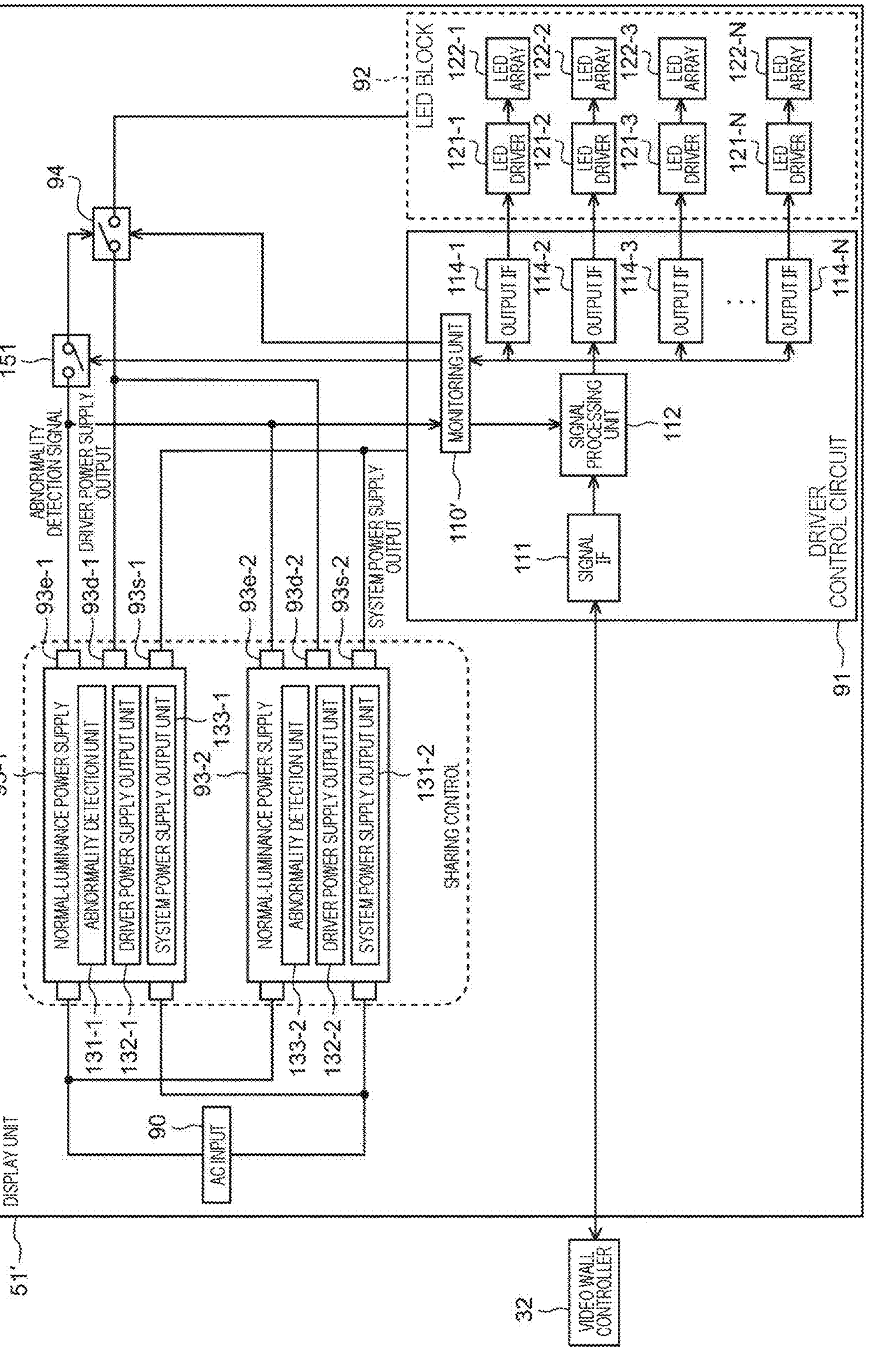
FIG. 9 is a diagram for describing an application example of the display system of the present disclosure.

FIG. 9 illustrates a configuration example of the display unit 51 configured not to supply the abnormality detection signal to the power supply switch 94 even if the abnormality detection signal is detected in any of the normal-luminance power supplies 93-1 and 93-2 when the video signal is in the luminance range displayable even in the normal-luminance mode, and to supply the abnormality detection signal to the power supply switch 94 when the video signal is in the luminance range undisplayable in the normal-luminance mode, in the case of the high-luminance mode.

Figure 5:
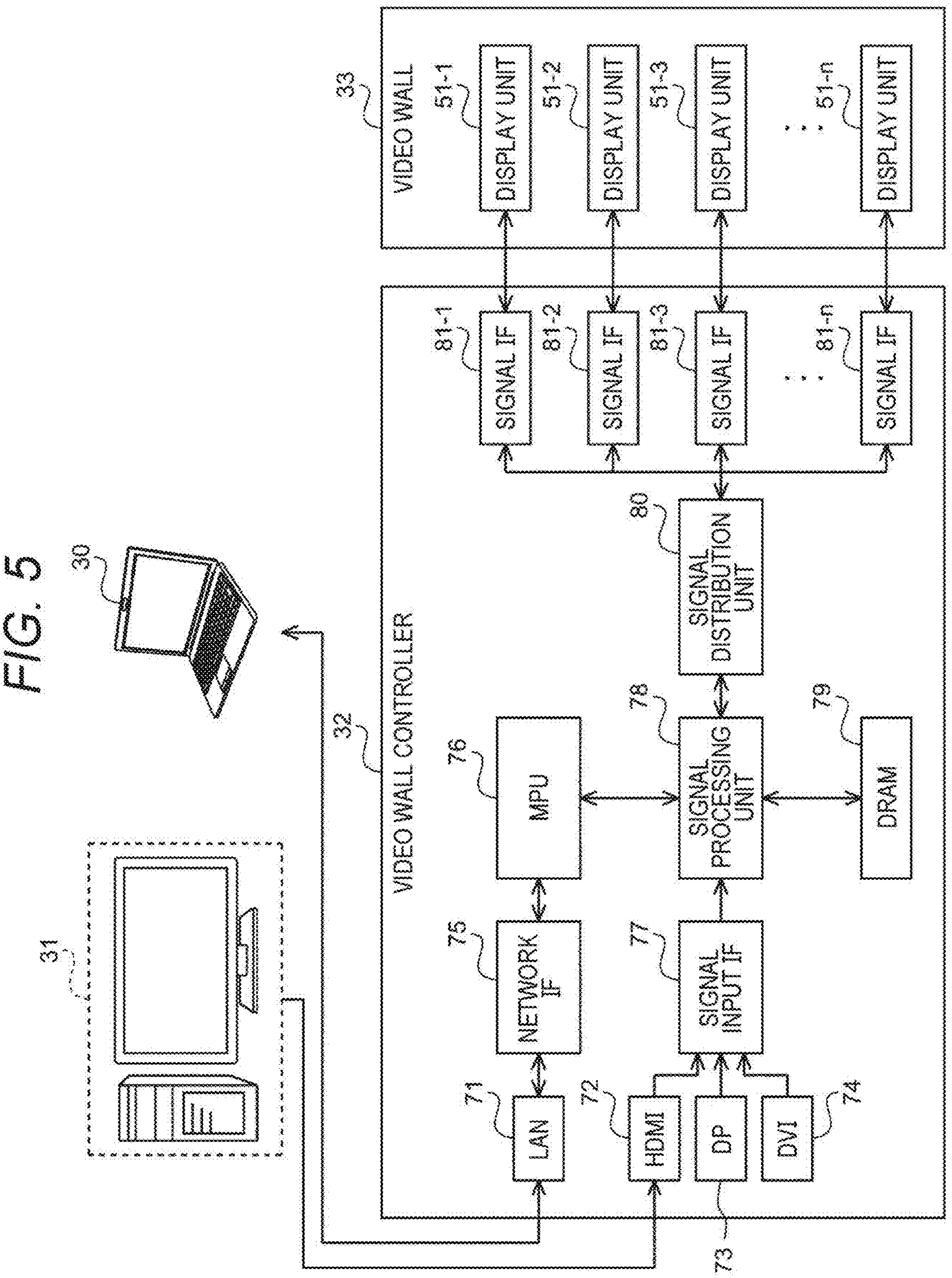
FIG. 5 is a diagram for describing a configuration example of a video wall controller in FIG. 4.

In the display unit 51 of FIG. 9, components having the same functions as those of the display unit 51 of FIG. 5 are denoted by the same reference numerals, and description thereof will be appropriately omitted.

The display unit 51 of FIG. 9 is different from the display unit 51 of FIG. 5 in that a monitoring unit 110' is provided instead of the monitoring unit 110, and an abnormality detection signal switch 151 is newly provided.

The abnormality detection signal switch 151 is an opening/closing switch including a MOS-FET or the like whose on/off is controlled by the monitoring unit 110', and is a switch that switches on/off of connection between the terminals **93*e*-1 and 93*e*-2 of the normal-luminance power supplies 93-1 and 93-2 and the power supply switch 94. Note that the abnormality detection signal switch 151 may have a configuration other than the opening/closing switch as long as the on/off is controlled by the monitoring unit 110'**, and may be configured by, for example, a logic circuit.

The monitoring unit 110' has the same basic function as the monitoring unit 110, but further determines whether or not the video signals supplied from the signal processing unit 112 to the LED block 92 via the output IFs 114-1 to 114-N are in the luminance range displayable even in the normal-luminance mode, and controls the abnormality detection signal switch 151 to be turned off when it is determined that the video signals are in the displayable luminance range and controls the abnormality detection signal switch 151 to be turned on when it is determined that the video signal is in the undisplayable luminance range.

According to such control, in the high-luminance mode, even if an abnormality occurs in any of the normal-luminance power supplies 93-1 and 93-2, when the video signal itself is in the luminance range displayable in the normal-luminance mode, the abnormality detection signal is not supplied to the power supply switch 94. Therefore, the power supply is not stopped, and the display mode remains in the high-luminance mode.

Furthermore, since the video wall controller 32 is not notified of the abnormality, the signal processing unit 78 does not need to perform the signal processing by setting the video signals to be supplied to all the display units 51 to the normal-luminance mode.

<Abnormality Detection Signal Switch Control Processing>

Figure 10:
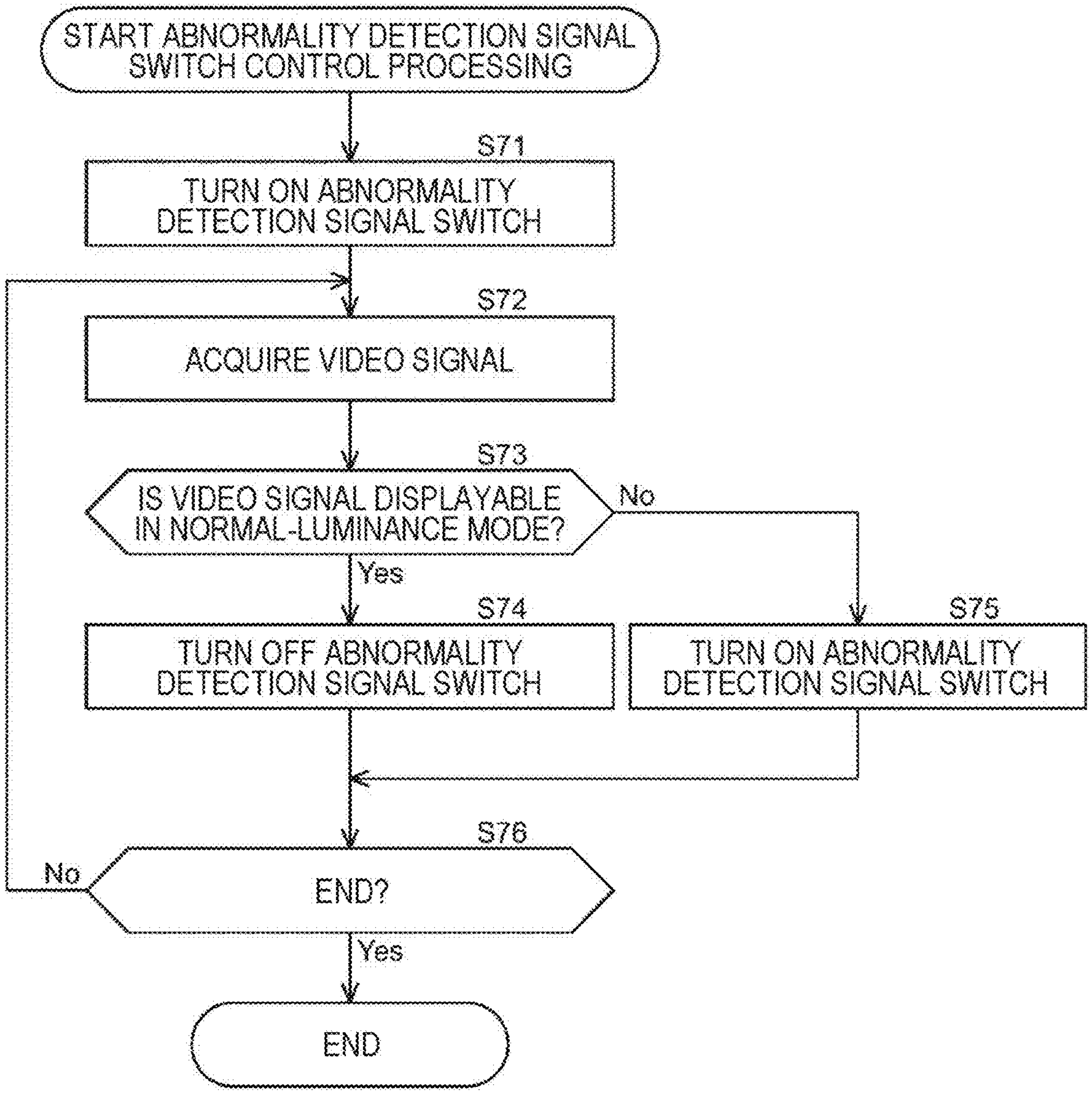
FIG. 10 is a flowchart for describing abnormality detection signal switch control processing by the display system in FIG. 9.

Next, abnormality detection signal switch control processing by the display unit 51 in FIG. 9 will be described with reference to the flowchart in FIG. 10.

In step S71, the monitoring unit 110' controls the abnormality detection signal switch 151 to be turned on.

In step S72, the monitoring unit 110' acquires the video signals in units of rows subjected to the video signal processing, which are to be output from the signal processing unit 112 to the output IFs 114-1 to 114-N.

In step S73, the monitoring unit 110' determines whether or not the acquired video signals subjected to the video signal processing in units of rows are in the luminance range displayable in the normal-luminance mode.

In step S73, in the case where it is determined that the video signals are in the luminance range displayable in the normal-luminance mode, the processing proceeds to step S74.

In step S74, the monitoring unit 110' sets the abnormality detection signal switch 151 to off.

On the other hand, in step S73, in the case where it is determined that the video signals are not in the luminance range displayable in the normal-luminance mode, the processing proceeds to step S75.

In step S75, the monitoring unit 110' sets the abnormality detection signal switch 151 to on.

In step S76, it is determined whether or not termination of the processing has been instructed, and the processing returns to step S72 in a case where termination is not instructed. That is, the processing of steps S72 to S76 is repeated until termination is instructed.

Then, in step S76, when it is determined that the instruction on the end is given, the processing ends.

According to the above processing, in the high-luminance mode, even if an abnormality occurs in any of the normal-luminance power supplies 93-1 and 93-2, when the video signal itself is in the luminance range displayable in the normal-luminance mode, the abnormality detection signal is not supplied to the power supply switch 94. Therefore, the power supply is not stopped, and the display mode can be kept in the high-luminance mode.

Furthermore, since the video wall controller 32 is not notified of the abnormality, the signal processing unit 78 does not need to perform the signal processing by setting the video signals to be supplied to all the display units 51 to the normal-luminance mode.

As a result, even if an abnormality occurs in any of the normal-luminance power supplies 93-1 and 93-2, it is possible to realize power supply redundancy, and even if an abnormality occurs in the power supply in any of the display units 51, it is possible to reduce the influence on the video wall controller 32 and the other display units 51.

Note that, although an example in which two normal-luminance power supplies 93 are provided in one display unit 51 has been described, the number of normal-luminance power supplies may be more than two. In that case, in a case where there are two or more normal-luminance power supplies 93 having no abnormality, the signal processing unit 112 can be used in the high-luminance mode, and switches the light emission mode to the normal-luminance mode when the number of normal-luminance power supplies 93 having no abnormality becomes one to enable generation of the video signal.

Note that the present disclosure may also have the following configurations.

<1> A display system including:

a driver configured to drive a display element on the basis of a video signal;

a plurality of power supplies configured to supply power capable of driving the display element to the driver in a first luminance mode in which the display element is driven in a first luminance range; and a driver control unit configured to control the driver so as to switch a luminance mode of the display element, in which the driver control unit controls the driver to drive the display element in a second luminance mode in which the display element is driven in a second luminance range higher in luminance than the first luminance range by power supply from the plurality of power supplies, and performs control to switch from the second luminance mode to the first luminance mode so that the driver drives the display element in the first luminance mode on the basis of detection of an abnormality in any of the plurality of power supplies.

<2> The display system according to <1>, further including:

a power supply switch configured to switch on or off of the power supply from the plurality of power supplies to the driver, in which the driver control unit performs control to switch from the second luminance mode to the first luminance mode so that the driver drives the display element in the first luminance mode after the power supply switch is turned off on the basis of detection of an abnormality in any of the plurality of power supplies.

<3> The display system according to <2>, in which the driver control unit controls the power supply switch to be turned on, and on the basis of the detection of an abnormality in any of the plurality of power supplies, the power supply switch turns off the power supply from the plurality of power supplies to the driver, and the driver control unit switches from the second luminance mode to the first luminance mode and performs control so that the display element is driven by the driver, and then controls the power supply switch to be turned on to resume the power supply from the plurality of power supplies to the driver.

<4> The display system according to <3>, in which the driver control unit controls the driver to drive the display element in the second luminance mode on the basis of a fact that there is no abnormality in any of the plurality of power supplies.

<5> The display system according to any of <1> to <4>, in which, in a case where the power supply is a single unit, the power supply of the power required for driving the display element is sometimes disabled in the second luminance mode, and the power supply of the power required for driving the display element is always suppliable in the first luminance mode.

<6> The display system according to any of <1> to <5>, in which the plurality of power supplies is subjected to sharing control so that current values become the same, and supplies the power to the driver in parallel.

<7> The display system according to any of <1> to <6>, in which the plurality of power supplies includes two of the power supplies.

<8> The display system according to <3>, in which the power supply further includes an abnormality detection unit that detects an own abnormality, the abnormality detection unit outputs an abnormality detection signal on the basis of the detection of the own abnormality, and on the basis of the output of the abnormality detection signal, the power supply switch turns off the power supply from the plurality of power supplies to the driver, and the driver control unit controls the driver to switch the display element from the second luminance mode to the first luminance mode to drive the display element, and then controls the power supply switch to be turned on again.

<9> The display system according to <8>, in which the driver control unit controls the driver to switch the display element from the second luminance mode to the first luminance mode to drive the display element, and then transmits a re-energization signal to the power supply switch, and the power supply switch is controlled to be turned on again on the basis of the re-energization signal.

<10> The display system according to <3>, in which the power supply further includes an abnormality detection unit that detects an own abnormality and outputs an abnormality detection signal on the basis of the detection of the own abnormality, and on the basis of the output of the abnormality detection signal, the driver control unit controls the power supply from the plurality of power supplies of the power supply switch to the driver to be turned off, then controls the driver to switch the display element from the second luminance mode to the first luminance mode to drive the display element, and controls the power supply switch to be turned on again.

<11> The display system according to <3>, in which the power supply further includes: an abnormality detection unit configured to detect an own abnormality and output an abnormality detection signal on the basis of the detection of the own abnormality; and an abnormality detection signal switch configured to control supply of the abnormality detection signal to the power supply switch supplied from the abnormality detection unit, in which the driver control unit controls on or off of the abnormality detection signal switch on the basis of luminance of the video signal subjected to video signal processing, the video signal being generated by executing the video signal processing for the video signal in the second luminance mode.

<12> The display system according to <11>, in which the driver control unit controls on or off of the abnormality detection signal switch on the basis of whether or not the luminance of the video signal subjected to the video signal processing, the video signal being generated by executing the video signal processing for the video signal in the second luminance mode, is within the first luminance range.

<13> The display system according to <12>, in which the driver control unit controls the abnormality detection signal switch to be turned off on the basis of a fact that the luminance of the video signal subjected to the video signal processing, the video signal being generated by executing the video signal processing for the video signal in the second luminance mode, is within the first luminance range, and controls the abnormality detection signal switch to be turned on on the basis of a fact that the luminance of the video signal subjected to the video signal processing is not within the first luminance range.

<14> The display system according to <3>, further including:

a plurality of display units including the plurality of power supplies, the power supply switch, and the driver control unit; and a controller configured to perform the video signal processing for the video signal, and distributes and supplies the video signal to the plurality of display units, in which the driver control unit notifies the controller that the abnormality is detected in any of the plurality of power supplies on the basis of the detection of the abnormality in any of the plurality of power supplies.

<15> The display system according to <14>, in which the controller performs the video signal processing for the video signal in the first luminance mode and distributes and supplies the video signal to the plurality of display units on the basis of the notification that the abnormality is detected in any of the plurality of power supplies from the driver control unit of any of the plurality of display units.

<16> The display system according to <14>, in which the controller outputs information for presenting that the abnormality is detected in any of the plurality of power supplies on the basis of the notification that the abnormality is detected in any of the plurality of power supplies from the driver control unit of any of the plurality of display units.

<17> The display system according to <14>, in which the driver control unit notifies the controller that the abnormality is detected in all of the plurality of power supplies and display is disabled on the basis of the detection of the abnormality in all of the plurality of power supplies.

<18> The display system according to <14>, in which the plurality of display units is arranged in an array and constitute a video wall, and an image formed by the video signal is displayed as one image on the entire video wall.

<19> The display system according to <18>, in which a first display unit included in the plurality of display units is connected to a second display unit included in the plurality of display units, and the controller supplies the video signal to the second display unit via the first display unit.

<20> A method of operating a display system including a driver that drives a display element on the basis of a video signal, a plurality of power supplies that supplies power capable of driving the display element to the driver in a first luminance mode in which the display element is driven in a first luminance range, and a driver control unit that controls the driver so as to switch a luminance mode of the display element, the method including:

by the driver control unit, controlling the driver to drive the display element in a second luminance mode in which the display element is driven in a second luminance range higher in luminance than the first luminance range by the power supply from the plurality of power supplies; and performing control to switch from the second luminance mode to the first luminance mode so that the driver drives the display element in the first luminance mode on the basis of detection of an abnormality in any of the plurality of power supplies, in which the driver control unit drives the display element in the second luminance mode by the power supply from the plurality of power sources, and performs control to switch from the second luminance mode to the first luminance mode so that the driver drives the display element in the first luminance mode on the basis of the detection of the abnormality in any of the plurality of power supplies.

REFERENCE SIGNS LIST

11 Display system
30 PC
31 Video server
32 Video wall controller
33 Video wall
51 and 51-1 to 51-*n* Display unit
78 Signal processing unit
90 AC input
91 Driver control circuit
92 LED block
93, 93-1, 93-2 Normal-luminance power supply
93*e*-1, 93*e*-2, 93*s*-1, 93*s*-2, 93*d*-1, 93*d*-2 Terminal
94 Power supply switch
110, 110' Monitoring unit
112 Signal processing unit
121 and 121-1 to 121-N Drive circuit
122 Pixel array
131, 131-1, 131-2 Abnormality detection unit
132, 132-1, 132-2 Driver power supply output
133, 133-1, 133-2 System power supply output
151 Abnormality detection signal switch

The invention claimed is:

1. A display system, comprising:

a driver configured to drive, based on a video signal, a display element in one of a first luminance mode or a second luminance mode;

a plurality of power supply devices, wherein each of the plurality of power supply devices is configured to supply, to the driver, a respective amount of power to drive the display element in one of the first luminance mode or the second luminance mode, the display element is in a first luminance range in the first luminance mode, the display element is in a second luminance range in the second luminance mode, and the second luminance range is higher in luminance than the first luminance range;

a power supply switch; and a driver control unit configured to:

control the driver to drive the display element in the second luminance mode based on the respective amount of power from the each of the plurality of power supply devices;

detect an abnormality in at least one of the plurality of power supply devices;

control, based on the detected abnormality, the power supply switch to turn off a power supply from the at least one of the plurality of power supply devices to the driver;

control, based on the turned off power supply, the driver to switch the display element from the second luminance mode to the first luminance mode; and control, in the first luminance mode, the power supply switch to turn on the power supply from the at least one of the plurality of power supply devices to the driver.

2. The display system according to claim 1, wherein the driver control unit is further configured to control the driver to drive the display element in the second luminance mode based on an absence of the abnormality in the at least one of the plurality of power supply devices.

3. The display system according to claim 1, wherein the plurality of power supply devices is associated with a plurality of current values, the each of the plurality of power supply devices is further configured to:

perform a sharing control process such that each of the plurality of current values is equal; and supply, in parallel, the respective amount of power to the driver.

4. The display system according to claim 1, wherein the plurality of power supply devices includes two power supply devices.

5. The display system according to claim 1, wherein each of the plurality of power supply devices includes a respective abnormality detection unit, the respective abnormality detection unit is configured to:

detect a respective abnormality in a respective power supply device of the plurality of power supply devices; and output a respective abnormality detection signal based on the detected respective abnormality, and based on the output of the respective abnormality detection signal, the driver control unit is further configured to:

control the power supply switch to turn off a power supply, to the driver, from the respective power supply device of the plurality of power supply devices;

control, based on the turned off power supply from the respective power supply device of the plurality of power supply devices, the driver to switch the display element from the second luminance mode to the first luminance mode; and control the power supply switch to turn on the power supply, to the driver, from the respective power supply device of the plurality of power supply devices.

6. The display system according to claim 5, wherein the driver control unit is further configured to:

control, based on the turned off power supply from the respective power supply device of the plurality of power supply devices, the driver to switch the display element from the second luminance mode to the first luminance mode;

transmit a re-energization signal to the power supply switch; and control, based on the re-energization signal, the power supply switch to turn on the power supply, to the driver, from the respective power supply device of the plurality of power supply devices.

7. The display system according to claim 1, wherein the each of the plurality of power supply devices includes a respective abnormality detection unit, the respective abnormality detection unit is configured to:

detect a respective abnormality in a respective power supply device of the plurality of power supply devices; and output a respective abnormality detection signal based on the detected respective abnormality, and based on the output of the respective abnormality detection signal, the driver control unit is further configured to:

control the power supply switch to turn off a power supply, to the driver, from the respective power supply device of the plurality of power supply devices;

control, based on the turned off power supply from the respective power supply device of the plurality of power supply devices, the driver to switch the display element from the second luminance mode to the first luminance mode; and control, in the first luminance mode, the power supply switch to turn on the power supply, to the driver, from the respective power supply device of the plurality of power supply devices.

8. The display system according to claim 1, further comprising a signal processing unit and an abnormality detection signal switch, wherein the signal processing unit is configured to perform, in the second luminance mode, a video signal process on the video signal, the video signal is associated with a specific luminance after the performance of the video signal process, the each of the plurality of power supply devices includes:

a respective abnormality detection unit configured to:

detect a respective abnormality in a respective power supply device of the plurality of power supply devices; and output, to the power supply switch, a respective abnormality detection signal based on the detected respective abnormality; and the abnormality detection signal switch is configured to control the output of the respective abnormality detection signal to the power supply switch, and the driver control unit is further configured to control, based on the specific luminance, the abnormality detection signal switch to one of turn on a connection between the respective power supply device of the plurality of power supply devices and the power supply switch, or turn off the connection between the respective power supply device of the plurality of power supply devices and the power supply switch.

9. The display system according to claim 8, wherein the driver control unit is further configured to control, based on the specific luminance is in the first luminance range, the abnormality detection signal switch to one of turn on the connection between the respective power supply device of the plurality of power supply devices and the power supply switch, or turn off the connection between the respective power supply device of the plurality of power supply devices and the power supply switch.

10. The display system according to claim 9, wherein the driver control unit is further configured to:

control, based on the specific luminance is in the first luminance range, the abnormality detection signal switch to turn off the connection between the respective power supply device of the plurality of power supply devices and the power supply switch; and control, based on the specific luminance is different from the first luminance range, the abnormality detection signal switch to turn on the connection between the respective power supply device of the plurality of power supply devices and the power supply switch.

11. The display system according to claim 1, further comprising:

a plurality of display units that includes:

the plurality of power supply devices, the power supply switch, and the driver control unit; and a controller configured to:

perform a video signal process on the video signal, and supply, based on the video signal process, the video signal to the plurality of display units, wherein the driver control unit is further configured to transmit, to the controller, a first notification associated with the abnormality in the at least one of the plurality of power supply devices.

12. The display system according to claim 11, wherein the controller is further configured to:

perform the video signal process on the video signal in the first luminance mode; and supply the video signal to the plurality of display units based on the transmitted first notification.

13. The display system according to claim 11, wherein the controller is further configured to output, based on the transmitted first notification, information associated with the detected abnormality in the at least one of the plurality of power supply devices.

14. The display system according to claim 11, wherein the driver control unit is further configured to transmit a second notification, to the controller, the second notification is associated with a respective abnormality in each of the plurality of power supply devices, and the plurality of display units is configured to display a black screen based on the transmitted second notification.

15. The display system according to claim 11, wherein the plurality of display units is in an array, a video wall includes the array, and the video signal forms an image on the video wall.

16. The display system according to claim 15, wherein the plurality of display units includes a first display unit and a second display unit, the first display unit is connected to the second display unit, and the controller is further configured to supply the video signal to the second display unit via the first display unit.

17. A method, comprising:

in a display system:

driving, by a driver, a display element based on a video signal, wherein the display element is in one of a first luminance mode or a second luminance mode;

supplying, by each of a plurality of power supply devices, a respective amount of power for driving the display element in the one of the first luminance mode or the second luminance mode, wherein the display element is in a first luminance range in the first luminance mode, the display element is in a second luminance range in the second luminance mode, and the second luminance range is higher in luminance than the first luminance range;

controlling the driver to drive the display element in the second luminance mode based on the respective amount of power from the each of the plurality of power supply devices;

detecting an abnormality in at least one of the plurality of power supply devices;

controlling, based on the detected abnormality, a power supply switch to turn off a power supply from the at least one of the plurality of power supply devices to the driver;

controlling, based on the turned off power supply, the driver to switch the display element from the second luminance mode to the first luminance mode; and controlling, in the first luminance mode, the power supply switch to turn on the power supply from the at least one of the plurality of power supply devices to the driver.

* * * * *